United States Patent [19]

Mueller et al.

[11] Patent Number: 5,676,504
[45] Date of Patent: Oct. 14, 1997

[54] KEY CUTTING MACHINE WITH KEY TRACING AND ELECTRONIC CODE CUTTING DUPLICATION MODES

[75] Inventors: Michael A. Mueller, Phoenix; Bradley Dee Carlson, Glendale; George L. Heredia, Paradise Valley, all of Ariz.

[73] Assignee: Axxess Technologies, Inc., Tempe, Ariz.

[21] Appl. No.: 572,766

[22] Filed: Dec. 14, 1995

[51] Int. Cl.[6] .................... B23C 1/16; B23C 3/35
[52] U.S. Cl. .................. 409/83; 76/110; 364/474.03; 409/81
[58] Field of Search ............... 409/82, 83, 81, 409/96, 131, 132; 76/110; 364/474.03, 474.02

[56] References Cited

U.S. PATENT DOCUMENTS

| | | |
|---|---|---|
| 943,806 | 12/1909 | Billings . |
| 1,135,676 | 4/1915 | Englebert . |
| 1,750,218 | 3/1930 | Falk . |
| 1,775,921 | 9/1930 | Williams . |
| 1,889,461 | 11/1932 | Hansen . |
| 1,923,164 | 8/1933 | Roos ........................ 90/13.2 |
| 3,440,906 | 4/1969 | Allen ........................ 76/110 |
| 4,143,582 | 3/1979 | Heimann .................... 90/13.05 |
| 4,437,150 | 3/1984 | Dahlgren, Jr. .............. 364/474 |
| 4,780,032 | 10/1988 | Uyeda et al. ............... 409/82 |
| 4,898,504 | 2/1990 | Agius et al. ............... 409/81 |
| 4,929,129 | 5/1990 | Dickson .................... 409/81 |
| 5,128,531 | 7/1992 | Fadel ...................... 250/202 |
| 5,259,708 | 11/1993 | Brice ...................... 409/83 X |
| 5,271,698 | 12/1993 | Heredia .................... 409/81 |

FOREIGN PATENT DOCUMENTS

| | | |
|---|---|---|
| 133091 | 2/1985 | European Pat. Off. . |
| 29 51 065 | 7/1981 | Germany . |
| JA 0201708 | 11/1984 | Japan . |

Primary Examiner—William R. Briggs
Attorney, Agent, or Firm—Cahill, Sutton & Thomas

[57] ABSTRACT

A key cutting machine includes a cutter wheel, a key follower and a key positioning fixture for retaining a master key and a key blank in defined positions. Longitudinal and lateral displacement elements displace the cutter wheel and the key blank relative to each other. First and second electronic position sensors generate cutter wheel longitudinal and lateral position signals which electrically define the position of the cutter wheel relative to the key blank blade. A mode control system selectively operates the key cutting machine in either an analog mode where the bit notch pattern of a master key is mechanically traced and duplicated in the key blade blank or in a digital mode in which an electronically defined bit notch pattern is electrically duplicated in the key blank blade without reference to or tracing the master key bit notch pattern.

113 Claims, 16 Drawing Sheets

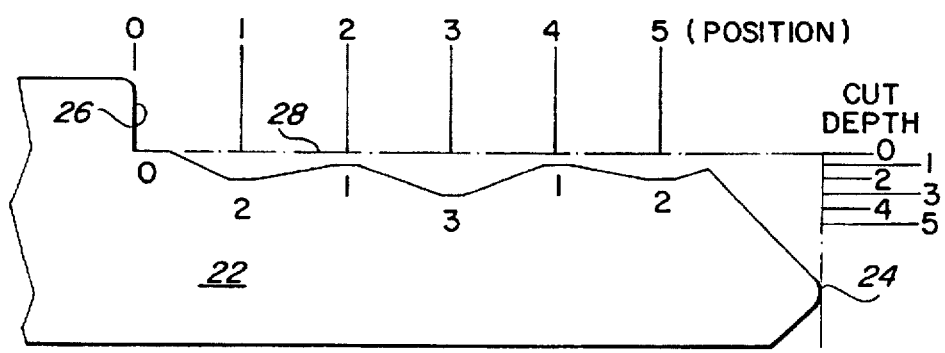
FIG-2
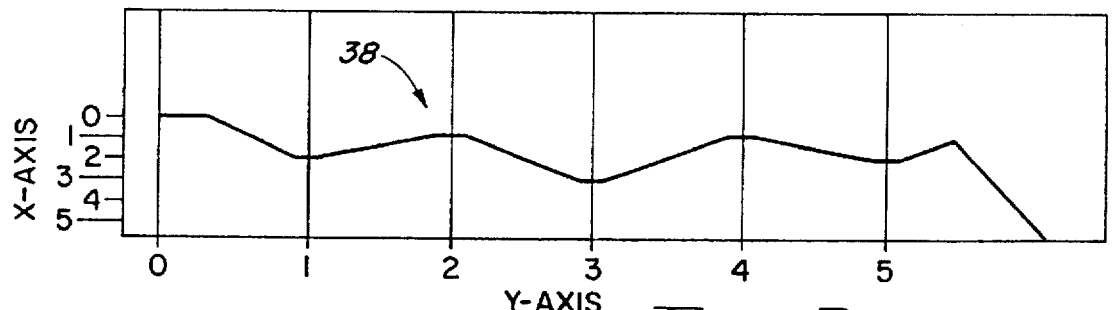
FIG-3
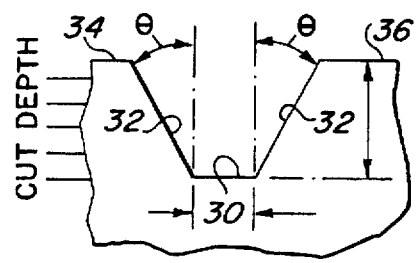
FIG-2A
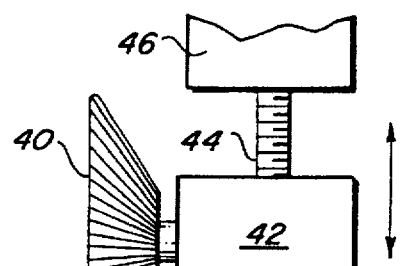
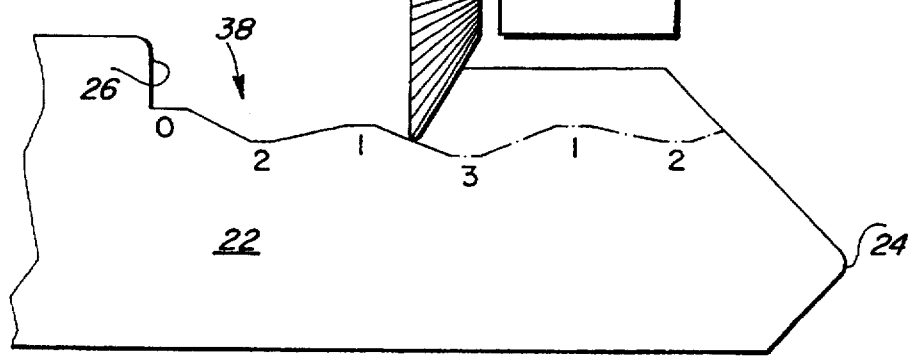
FIG-4

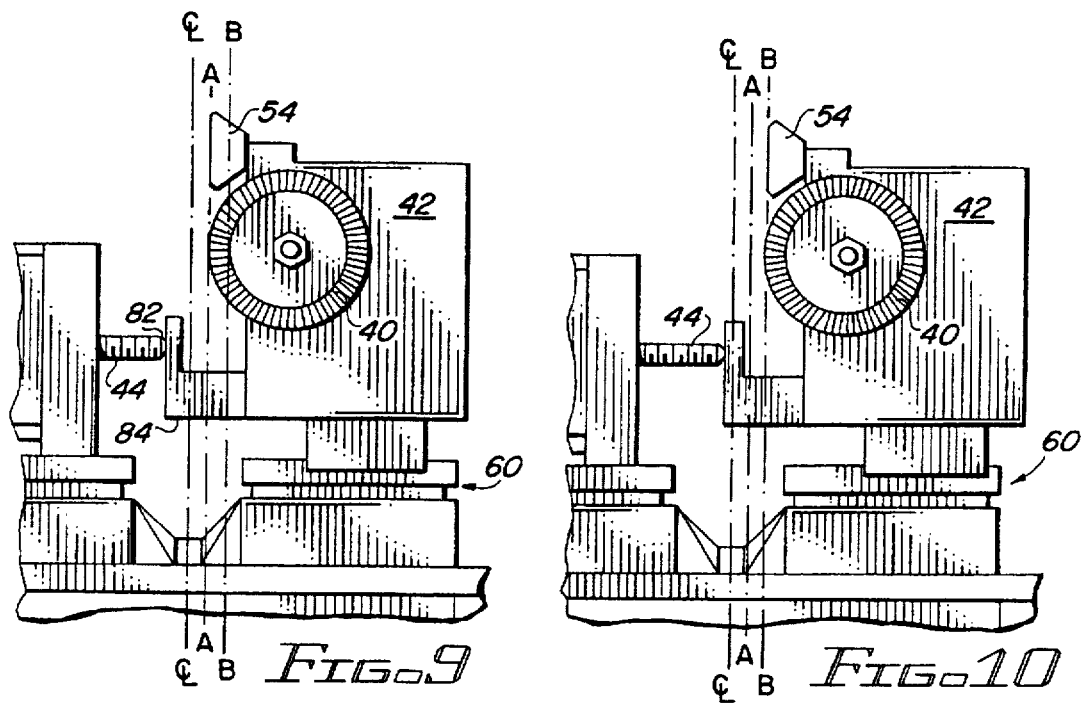
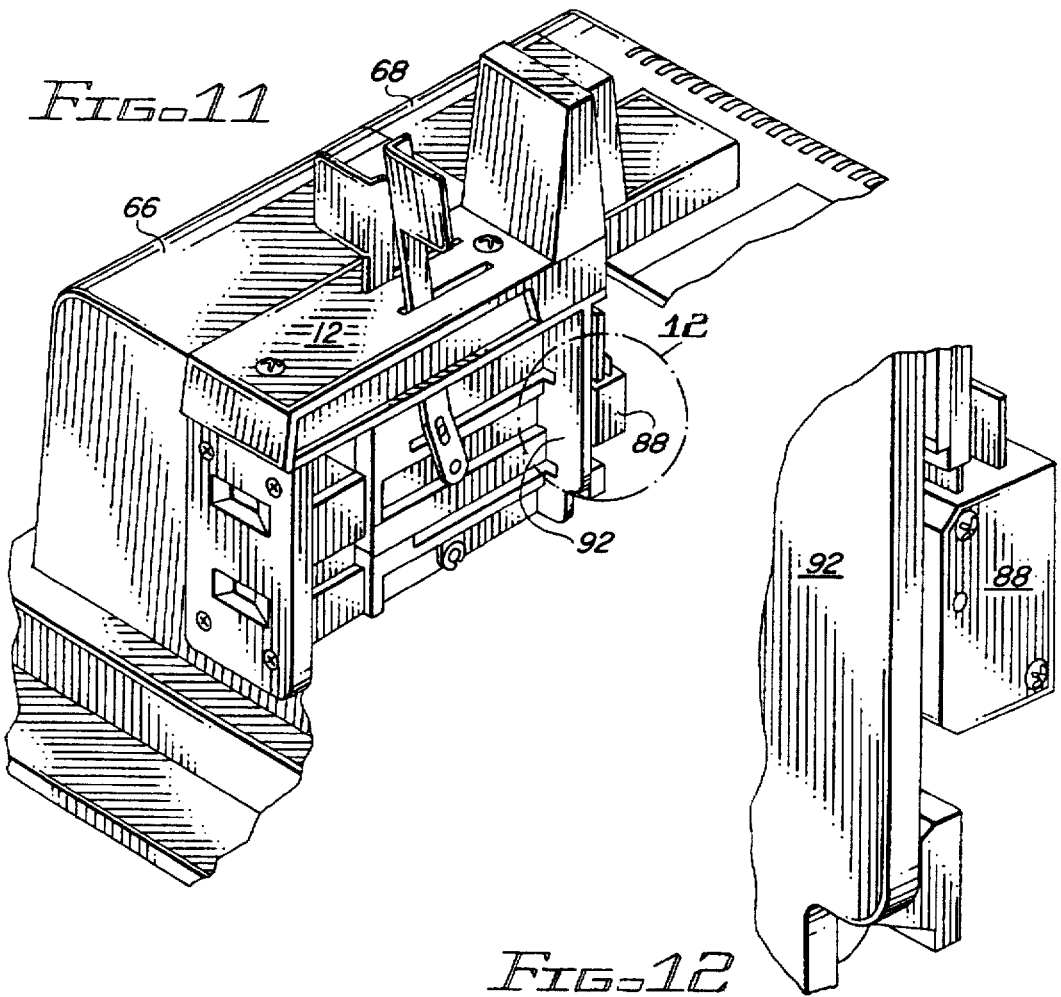

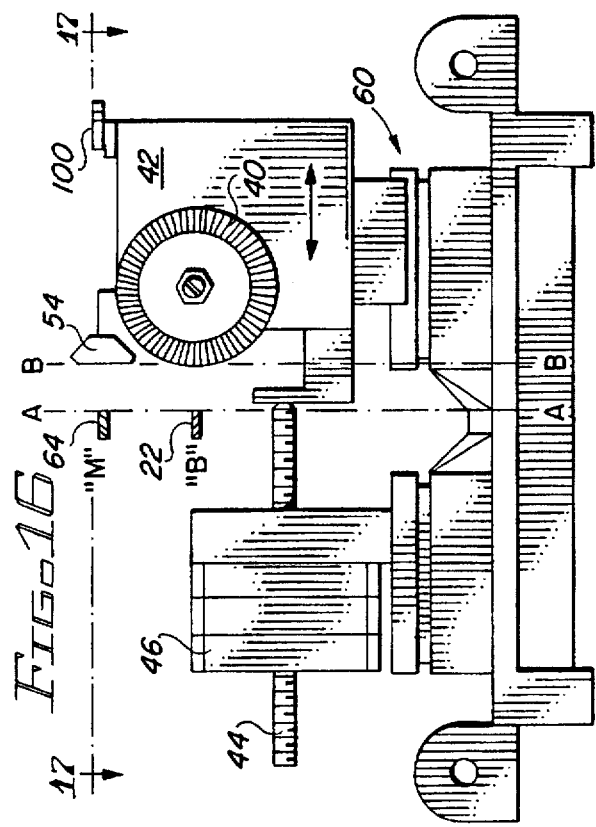
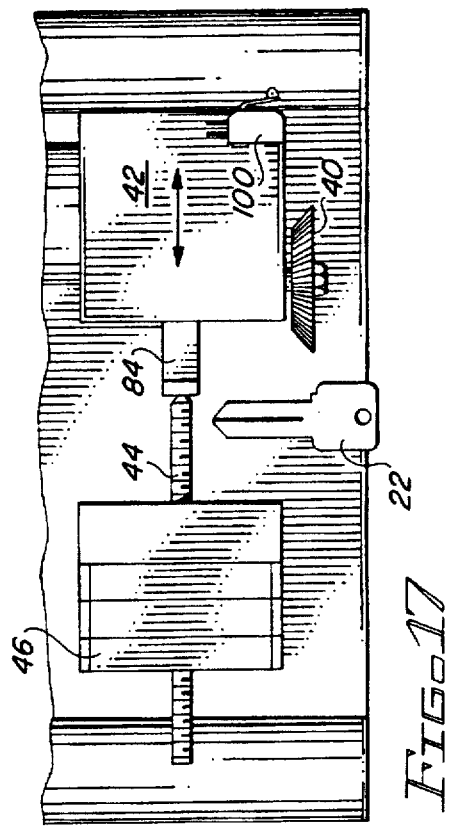
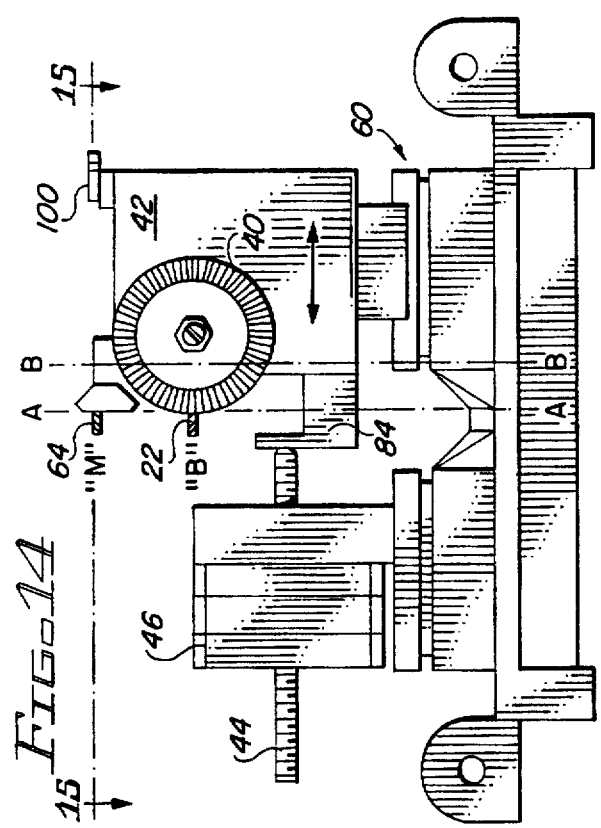
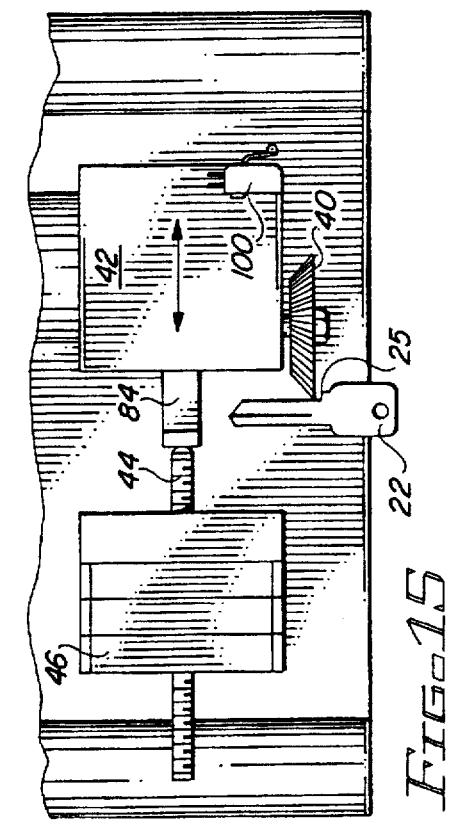

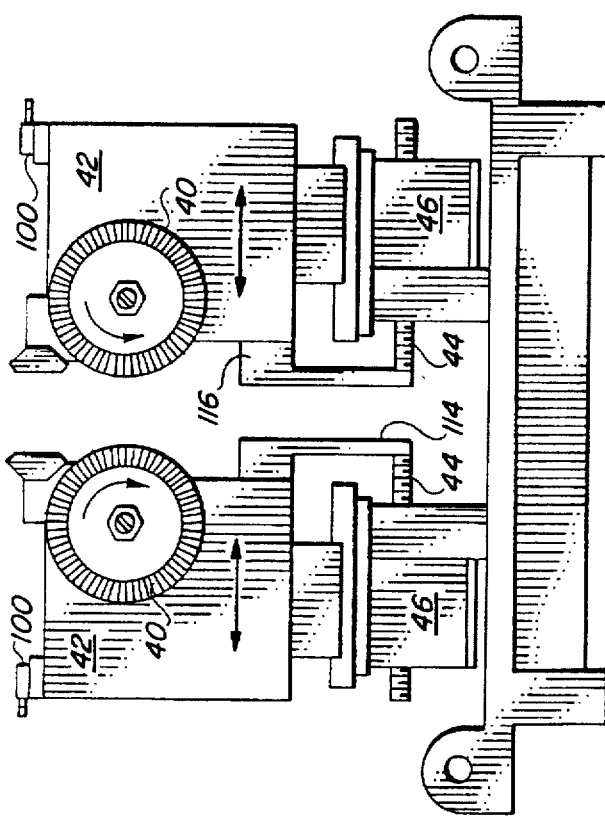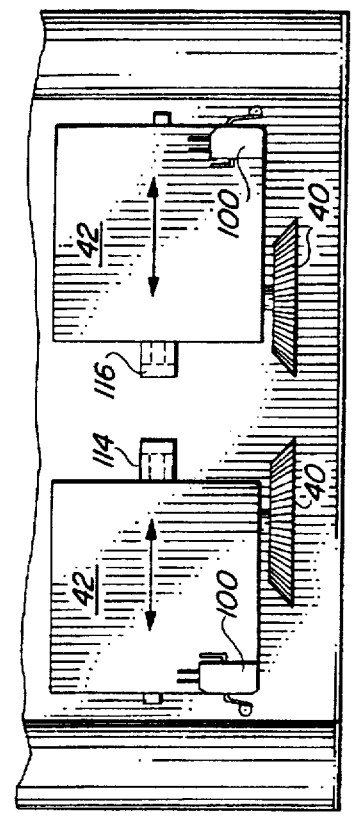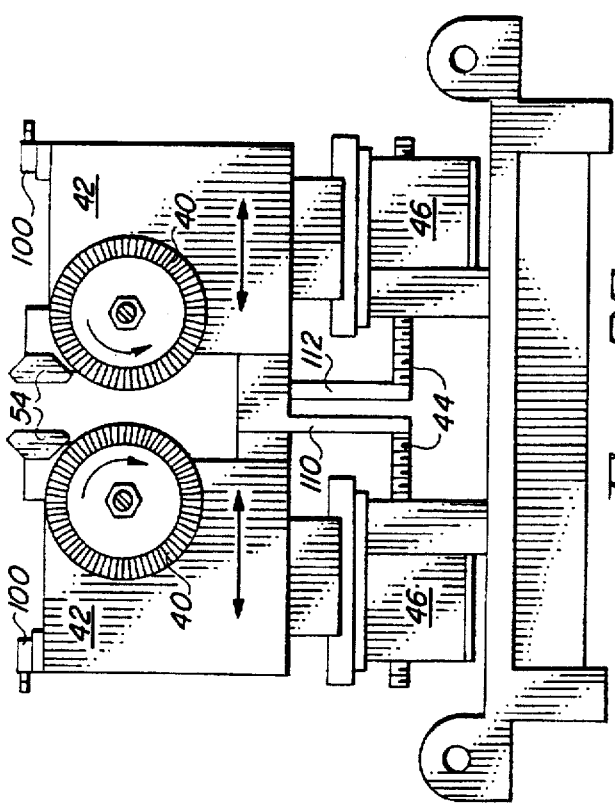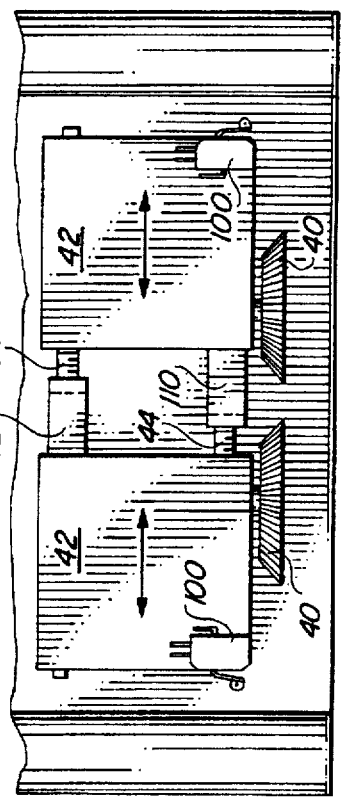

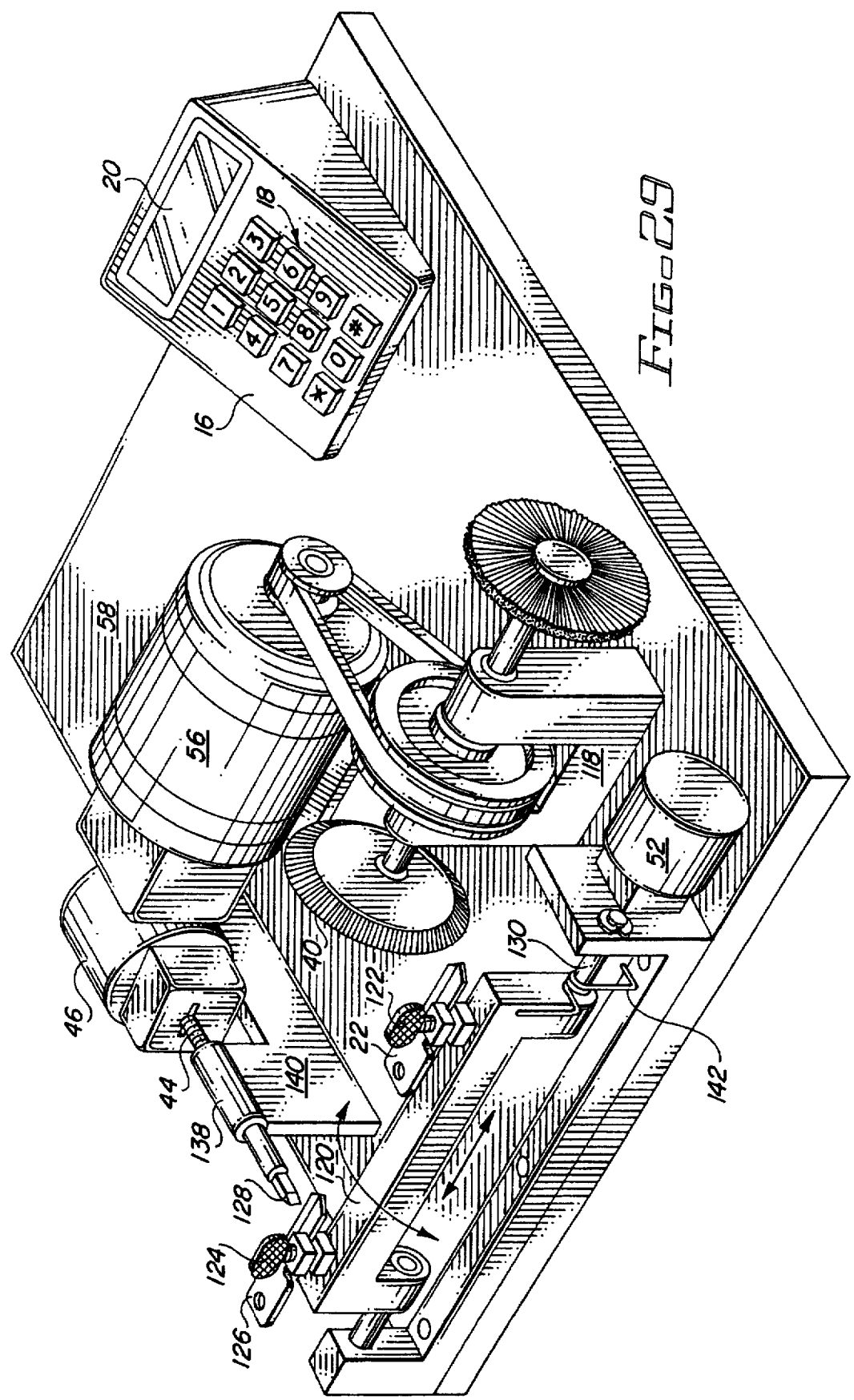

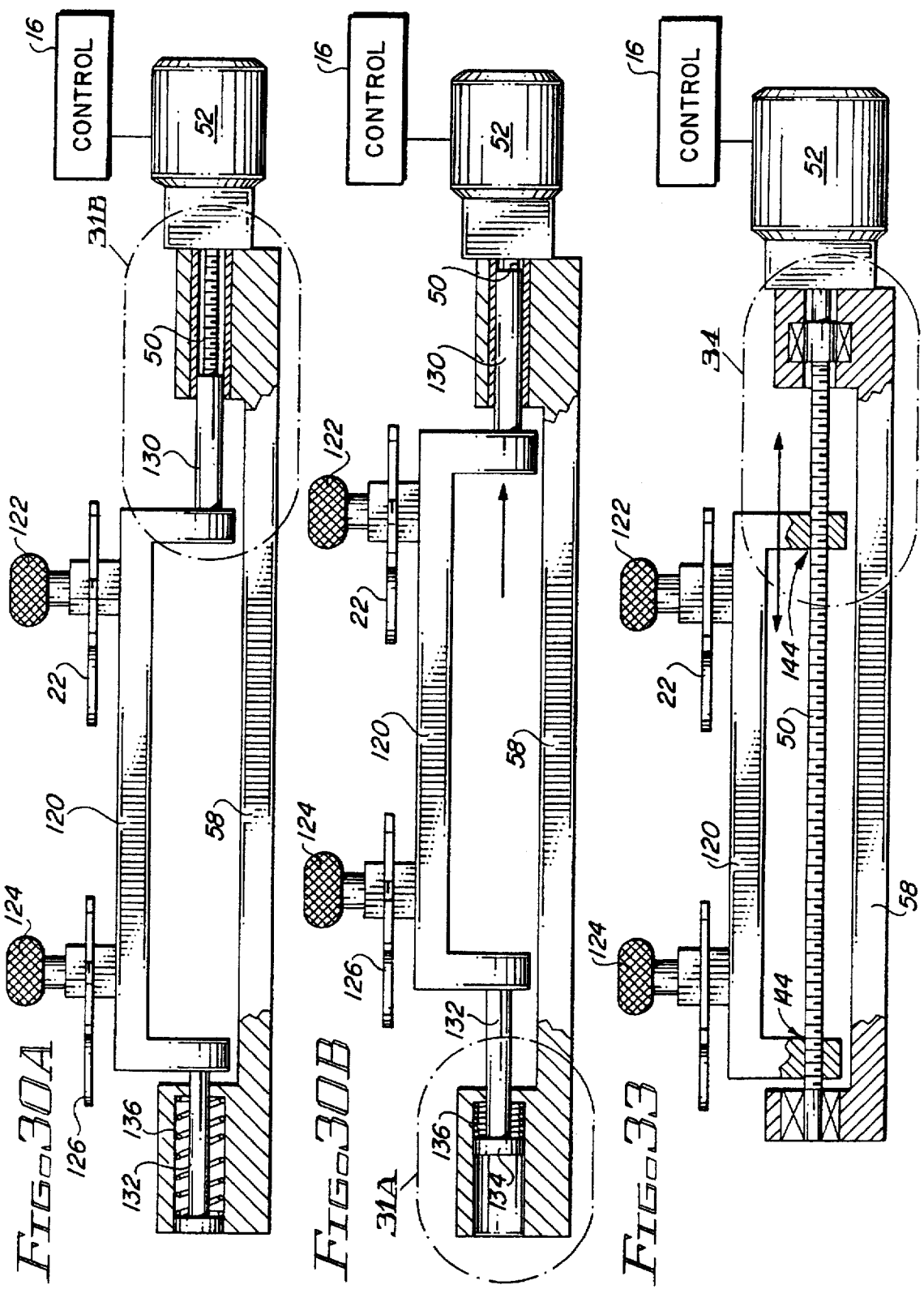

KEY CUTTING MACHINE WITH KEY TRACING AND ELECTRONIC CODE CUTTING DUPLICATION MODES

BACKGROUND OF THE INVENTION

1. Field of the Invention

This invention relates to key cutting machines, and more particularly, to key cutting machines which can be configured to either trace the bit notch pattern of a master key and duplicate the traced bit notch pattern on a key blank blade or which can utilize a key code to generate a duplicate key without reference to the bit notch pattern of a master key.

2. Description of the Prior Art

A wide variety of key cutting machines have been designed to mechanically trace and duplicate the bit notch pattern of a master key or to either mechanically or electronically duplicate a bit notch pattern defined by a key code or by a series of depth designators.

U.S. Pat. No. 943,806 to Billings discloses a key cutting machine which includes a key follower for mechanically tracing the bit notch pattern of a master key.

U.S. Pat. No. 1,135,676 to Englebert discloses a key cutting machine including a cutter wheel and a key follower for tracing the bit notch pattern of the master key.

U.S. Pat. No. 1,750,218 to Falk discloses a dual mode key cutting machine which can either mechanically trace and duplicate the bit notch pattern of a master key onto a key blank or which, by reference to a numerical code, can mechanically control the 33position of the cutter wheel to create a duplicate key without reference to the bit notch pattern of a master key.

U.S. Pat. No. 1,775,921 to Williams discloses a dual mode key cutting machine which can either mechanically trace and duplicate the bit notch pattern of a master key onto a key blank or which, by reference to a numerical code, can mechanically control the position of the cutter wheel to create a duplicate key without reference to the bit notch pattern of a master key.

U.S. Pat. No. 1,889,461 to Hansen discloses a key cutting machine which generates a bit notch pattern on a key blank by reference to graduated template 40 which allows the cutter wheel to generate a notch in a key blank with a depth controlled by template 40.

U.S. Pat. No. 1,923,164 to Roos discloses a mechanical code cutter key duplication system utilizing a cylinder 18 having longitudinal and circumferentially spaced holes which forms a template which controls the cutting depth of cutter wheel 6.

U.S. Pat. No. 3,440,906 to Allen discloses a key cutting machine having the capability of either tracing the bit notch pattern of a master key or using the code plug 170 illustrated in FIG. 7 to cut a bit notch pattern in a key blank based upon key codes rather than key tracing.

U.S. Pat. No. 4,143,582 to Heimann discloses a two-step key duplication process. The first step involves creating a three dimensional recording in thin metallic foil of each of the two sides of a master key. The three-dimensional recording is then used to actuate and control the operation of a key duplication device which extracts data from the three-dimensional recording and produces a key having a bit notch pattern identical to the bit notch pattern of the master key.

U.S. Pat. No. 4,437,150 to Dahlgren patent discloses an engraving tool having an intelligent terminal which processes data supplied by a user. The engraving system includes a control unit which transforms instructions into drive signals which are communicated to a mechanical tool manipulating device such that the mechanical tool is manipulated in response to the drive instructions.

U.S. Pat. No. 4,780,032 to Uyeda discloses a key cutting machine having the capability of either tracing the bit notch pattern of a master key onto a key blank or creating a duplicate key by reference to a manufacturer's code which is replicated by guide cam 57 on a one at a time basis onto a key blank.

U.S. Pat. No. 4,898,504 to Agius et al. discloses another key cutting machine capable of either duplicating the bit notch pattern of a master key onto a key blank by tracing or by cutting a key blank to form a desired bit notch pattern in response to a lock manufacturer's code. Cam element 34 as illustrated in FIG. 6 is used in the code-based key duplicating operating mode.

U.S. Pat. No. 5,128,531 to Fadel discloses an electronic key duplication system using stepper motors 5, 8 to control the X and Y axis position of key 12 relative to cutter wheel 14. A photoemitter/photodetector system reads the bit notch pattern of master key which in response to computer control is used to position stepper motors 5, 8 to permit the bit notch pattern of a master key 11 to be duplicated on key blank 11 without direct mechanical reference to or tracing of the bit notch pattern of master key 11.

U.S. Pat. No. 5,271,698 to Heredia discloses a key cutting machine having a pair of opposing laterally translatable, but longitudinally fixed cutter heads. A movable cassette serves as a key retaining fixture for a variety of keys. One cassette embodiment includes a mechanical notch pattern simulator which allows a key identified by a key code to be duplicated on a key blank by using he notch pattern simulator disclosed in the Heredia patent.

German Patent No. 29 51 065 discloses a computer-controlled key cutting machine for cutting bit notch patterns in double-sided keys solely by reference to a manufacturer's key code and without reference to or tracing of the bit notch pattern of a master key. The lateral position of cutter wheels F1 and F2 are electromechanically controlled by devices designated by reference numbers D1 and D2. The longitudinal position of cutter wheels F1 and F2 is controlled by the device designated by reference letters B, C.

Japanese Patent No. 0201708 discloses a computer-controlled milling machine which, in response to a key manufacturer's code, mills a designated bit notch pattern into the blade of a key blank. The disclosed system does not provide for any form of key duplication which relies on tracing the bit notch pattern of a master key.

EPO Patent No. 133,091 discloses a system for electronically converting a manufacturer's key code into a bit notch pattern in the blade of key blank 19. Motor 6 through a pulley system 8, 10 rotates cutter wheel 12 which is rigidly coupled to a base 5. A computer controlled actuator 16 controls the lateral position of table 14 and key blank 19 relative to cutter wheel 12. Actuator 17 is rigidly coupled to table 14 and controls the longitudinal position of key blank 19 relative to cutter wheel 12. In this system, key 19 is displaced both longitudinally and laterally relative to fixed position cutter wheel 12. The system disclosed in this patent does not provide for mechanical tracing or following of the bit notch pattern of a master key for the purpose of duplicating that bit notch pattern onto the blade of a key blank.

SUMMARY OF THE INVENTION

It is therefore a primary object of the present invention to provide a key cutting machine which can duplicate either single-sided or double-sided keys by selectively operating in either an analog mode in which a key follower mechanically traces and allows a cutter wheel to mechanically duplicate a master key bit notch pattern in a key blank blade or in a digital mode where the same key cutting machine can electronically duplicate a bit notch pattern defined by a key code without reference to the master key bit notch pattern.

Another object of the present invention is to provide a key cutting machine where defined bit notch patterns are stored in an electronic control unit and an appropriate bit notch pattern is selected in response to a user-designated key code.

Yet another object of the present invention is to provide a key cutting machine which while operating in the analog mode allows the cutter wheel to be laterally displaced by the key follower which engages the master key bit notch pattern or while operating in the digital mode laterally displaces the cutter wheel under computer control to electronically duplicate the defined bit notch pattern in the key blank without reference to the master key bit notch pattern.

Still another object of the present invention is to provide a key cutting machine which utilizes either a pair of linear actuators or a pair of stepper motors to provide the necessary electronically defined lateral and longitudinal displacements of the key blank relative to the cutter wheel when the system is operating in the digital mode.

Briefly stated, and in accord with one embodiment of the invention, a key cutting machine having a longitudinal axis and a lateral axis is configured to cut a defined bit notch pattern into a key blank having a longitudinal axis and a lateral axis, a length, a blade for receiving the defined bit notch pattern, a shoulder and a tip. The configuration of the defined bit notch pattern is specified either by a digital data signal or by a bit notch pattern in a blade of a master key having a longitudinal and a lateral axis.

The key cutting machine includes a cutter, a key follower spaced apart from the cutter wheel and a motor for rotating the cutter wheel.

A key positioning fixture includes a first key positioning fixture and a second key positioning fixture. The first key positioning fixture aligns the longitudinal and lateral axes of the master key with the longitudinal and lateral axes of the key cutting machine and defines first longitudinal and lateral index positions relative to the master key blade. The second key positioning fixture aligns the longitudinal and lateral axes of the key blank with the longitudinal and lateral axes of the key cutting machine. The second key positioning fixture also aligns the master key bit notch pattern and the key blade blank relative to each other and, in addition, defines second longitudinal and lateral index positions relative to the key blank blade.

A longitudinal displacement element longitudinally displaces the cutter wheel and the key blank blade relative to each other.

A first electronic position sensor is coupled to the longitudinal displacement element to measure the longitudinal position of the cutter wheel relative to the second longitudinal index position to generate a cutter wheel longitudinal position signal which defines the longitudinal position of the cutter wheel relative to the key blank blade.

A lateral displacement element laterally displaces the cutter wheel and the key blank blade relative to each other.

A second electronic position sensor is coupled to the lateral displacement element to measure the lateral position of the cutter wheel relative to the second lateral index position and generates a cutter wheel lateral position signal which defines the lateral position of the cutter wheel relative to the key blank blade.

A mode control system selectively operates the key cutting machine either in an analog mode or in a digital mode. In the analog mode, the lateral displacement element is disabled and the key follower engages the master key bit notch pattern and laterally displaces the cutter wheel and the key blank blade relative to each other as the key follower and the master key blade are longitudinally displaced relative to each other to mechanically trace and duplicate the master key bit notch pattern and the key blank blade. In the digital mode, the lateral displacement element laterally displaces the cutter wheel and the key blank blade relative to each other in response to the digital data signal and the longitudinal and lateral cutter wheel position signals as the cutter wheel and the key blank blade are longitudinally displaced relative to each other to electronically duplicate the defined bit notch pattern in the key blank blade without reference to the master key bit notch pattern.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 2 represents an elevational view from the side of a single-sided key.

FIG. 2A represents an enlarged view of one element of the bit notch pattern illustrated in FIG. 2.

FIG. 3 is a graph depicting the elements of the bit notch pattern of the key illustrated in FIG. 2.

FIG. 4 symbolically illustrates how the bit notch pattern of a single-sided key is duplicated in response to lateral movement of the lateral displacement element of the present invention.

FIG. 9 represents a partially cutaway front elevational view of the key cutting machine illustrated in FIG. 6 showing the cutter laterally positioned for shoulder indexing.

FIG. 10 represents a partially cutaway front elevational view of the key cutting machine illustrated in FIG. 6 showing the cutter head laterally positioned for tip indexing.

FIG. 11 represents an enlarged, partially cutaway perspective view of the key cutting machine particularly illustrating cassette 12 of FIG. 1A.

FIG. 12 represents an enlarged perspective view of the structure illustrated in FIG. 11 lying within the area designated by dotted lines.

FIG. 14 illustrates the key cutting machine of FIG. 7 with the cutter head laterally positioned for shoulder indexing.

FIG. 15 represents a view from above of the key cutting machine illustrated in FIG. 14.

FIG. 16 represents a front elevational view of the key cutting machine illustrated in FIG. 7 with the cutter head laterally positioned for tip indexing.

FIG. 17 represents a view from above of the key cutting machine illustrated in FIG. 16.

FIG. 25 represents a front elevational view of an embodiment of a key cutting machine of the present invention including a pair of cutter heads for simultaneously duplicating the two bit notch patterns of a double-sided key.

FIG. 26 represents a view from above of the key cutting machine illustrated in FIG. 25.

FIG. 27 represents a front elevational view of a second embodiment of a key cutting machine of the present invention including a pair of cutter heads for simultaneously duplicating the two bit notch patterns of a double-sided key.

FIG. 28 represent a view from above of the key cutting machine illustrated in FIG. 27.

FIG. 29 represents a perspective view of another embodiment of the present invention which includes a fixed position cutter wheel and a fixed position motor.

FIGS. 30A and 30B represent front elevational views of the key cutting machine illustrated in FIG. 29 showing the key positioning fixture 120 at first and second longitudinal positions.

FIG. 33 illustrates another embodiment of the key cutting machine of the present invention including a key positioning fixture the longitudinal position of which is controlled by a threaded rod.

DESCRIPTION OF THE PREFERRED EMBODIMENT

Figure 1A:
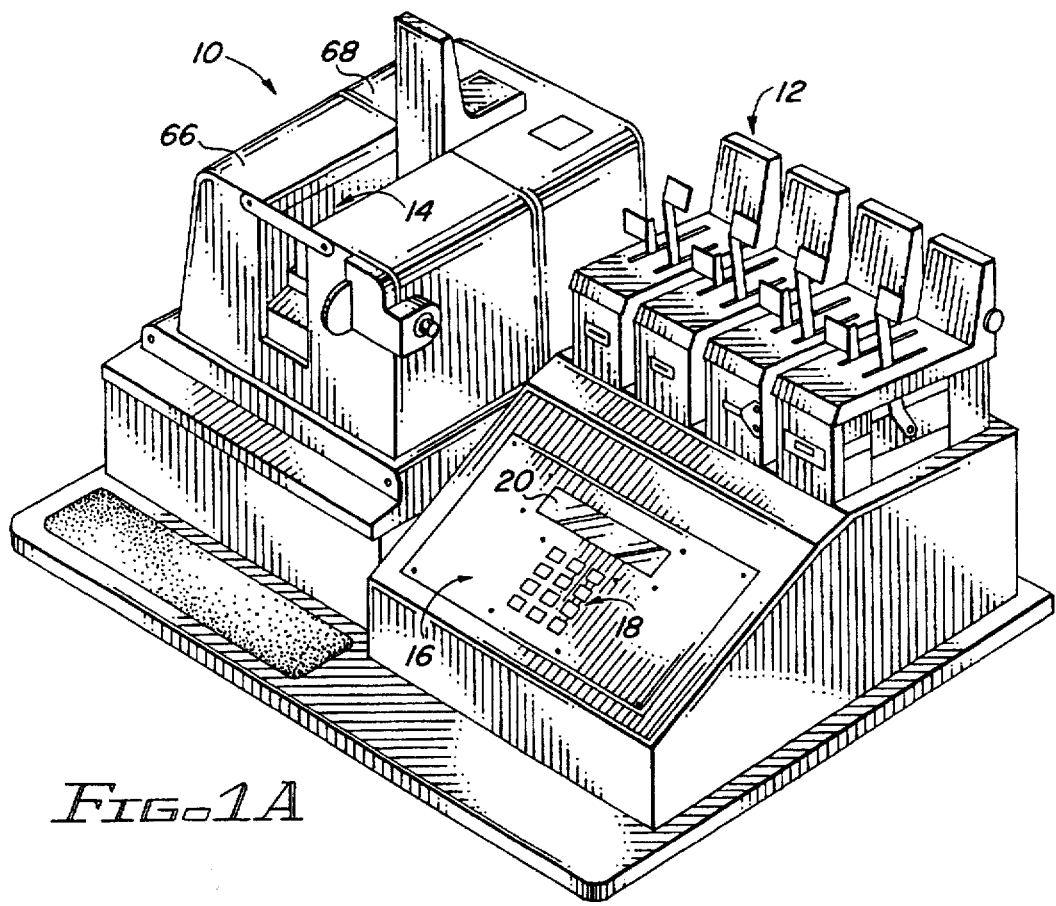
FIG. 1A illustrates a perspective view of one embodiment of the key cutting machine of the present invention.
Figure 1B:
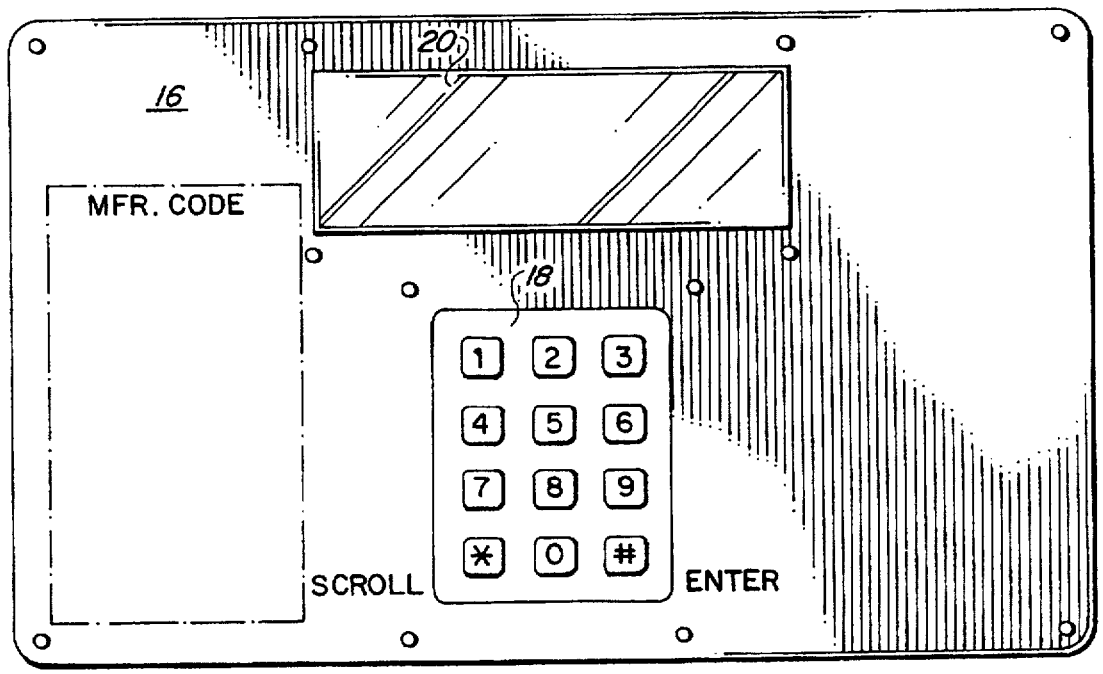
FIG. 1B represents an enlarged elevational view of the electronic control unit of the key cutting machine illustrated in FIG. 1A.

In order to better illustrate the advantages of the invention and its contributions to the art, several preferred hardware embodiments of the invention will now be described in detail.

Referring now to FIGS. 1A, 1B, 6, 7 and 8, the present invention includes a key cutting machine including a set of key positioning fixtures or cassettes 12 which may be selectively inserted into cassette receiving aperture 14 in the case of key cutting machine 10.

Electronic control unit 16 includes a user-actuated control panel 18 and an LCD display panel 20. Electronic control unit 16 includes a microprocessor-based data processing system of conventional design with an EPROM (erasable programmed read only memory) in which a digital database is permanently stored.

The key cutting machine of the present invention may be operated in either an analog mode or in a digital mode. In the analog mode, the key cutting machine uses structure essentially identical to that disclosed in FIGS. 16-48 of U.S. Pat. No. 5,443,339 issued on Aug. 22, 1995, the disclosure of which is hereby incorporated by reference. When switched into the digital mode, the key cutting machine of the present invention disables the key follower and electronically controls all movement of the system elements to duplicate a bit notch pattern in a key blank without reference to or tracing of the bit notch pattern of the master key. The significant modifications to the key cutting machine system disclosed in the '337 patent to allow the key cutting machine of the present invention to be selectively operated either in the analog mode or in the digital mode will now be described in detail.

In the digital operating mode, key cutting machine of the present invention is reconfigured into an electronic key code duplication system which is particularly useful in the automotive industry where data included in the vehicle identification number (VIN) can be accessed and decoded through a secondary database to obtain a sequentially arranged series of numbers which can be used to replace a vehicle key by code cutting rather than by key tracing.

For example, a particular Ford ignition key referred to as the Ford long key includes ten cuts along the length of each of the two sides of the key blade. The longitudinal position of each cut along the length of the Ford ignition key is fixed according to factory specifications. The sole variable represents the depth of each cut. By reference to a specific series of fields in the VIN and by reference to a special data base accessible to licensed Ford dealers, the dealer can convert the VIN code into an appropriate sequence of ten numbers which can be used to duplicate a lost Ford ignition key solely by reference to those code numbers.

Referring now to FIGS. 2, 2A, 3, 4 and 5, the principles underlying the digital or code cutting operating mode of the present invention will now be explained. FIG. 2 illustrates a side elevational view of the blade of a typical single-sided key 22. Such single-sided keys include a tip 24, a shoulder 26 and a key blade which extends between tip 24 and shoulder 26. The key blade includes an outer surface 28 which is configured to receive a plurality of variable depth notches or cuts which taken together may be referred to as the bit notch pattern of the key.

In FIG. 2, a series of longitudinally spaced apart longitudinal or Y-axis marks beginning with "0" at shoulder 26 and continuing to mark "5" at tip 24 define the center point of each of a series of flats which interface with corresponding tumblers of the lock. If the longitudinal position and the cut depth as designated at the right side of FIG. 2 correspond to the positions and lengths of the related lock tumblers, the bit notch pattern of the key will be compatible with the lock tumblers and will allow the key to actuate the lock. As illustrated in FIG. 2, the cut depth or X-axis dimension of each flat in a bit notch pattern can be defined by a depth beginning with 0 which represents an uncut portion of key blade outer surface 28 to as deep as a cut depth of 5 which for the FIG. 2 key represents the maximum cut depth. The number of available longitudinally spaced apart flats and the number of cut depths available for particular key styles vary considerably as is well known to persons of ordinary skill in the art.

In the preferred embodiment of the digital operation mode of the present invention, a standard bit notch pattern cutting technique generally known as the laser cut technique has been selected and programmed into electronic control unit 16 to generate an appropriate bit notch pattern in response to the series of digits derived from a typical key code. With the laser cut technique, the width or length of each flat of a bit notch pattern is fixed while the angle of inclination of the cut sides varies according to a predefined pattern determined by the position and depth of each flat.

FIG. 2A illustrates fixed length or fixed width flat 30 and angled sides 32 which have been cut to interconnect with the 0 level cut depth of adjacent fixed or uniform width flats 34 and 36. As illustrated in FIG. 2A, the laser cut technique defines the length and angular orientation of sides 32 by merely connecting the end points of adjacent flats by a straight line. FIG. 3 illustrates the X-axis (depth) and Y-axis (longitudinal position) of a series of fixed width flats which define bit notch pattern 38. While the laser cut technique represents a preferred mode of defining the geometry of a selected bit notch pattern, many other well known techniques for defining the geometry of a bit notch pattern could readily be accommodated by the present invention.

Figure 5:
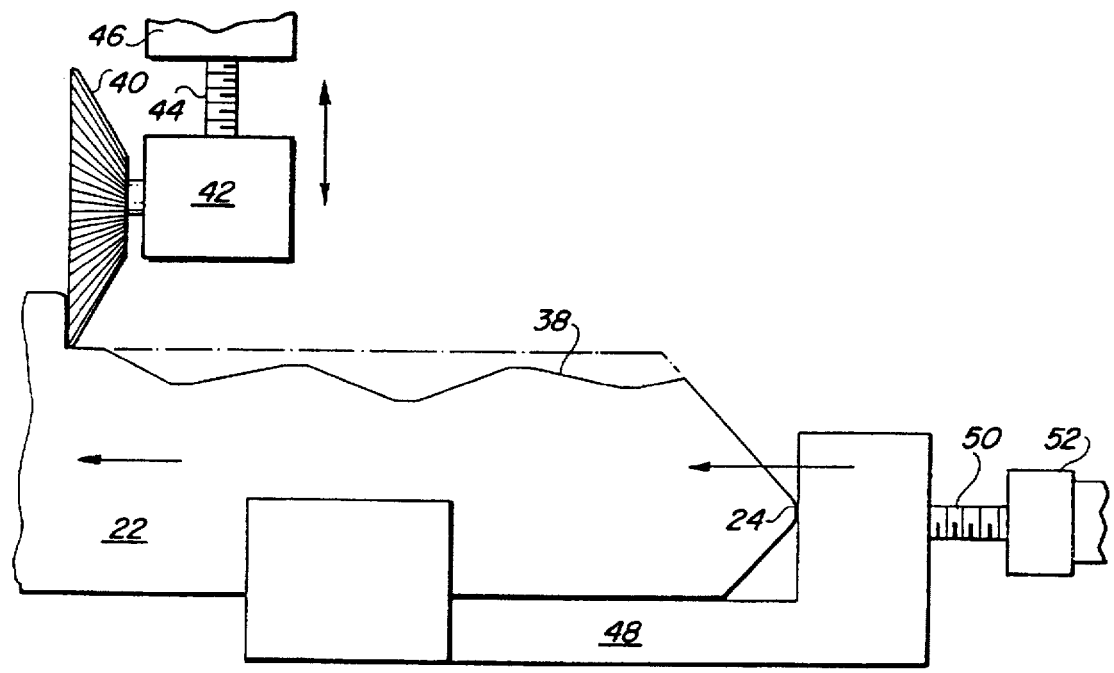
FIG. 5 symbolically depicts the lateral and longitudinal displacement elements of the present invention illustrating how computer-controlled lateral and longitudinal relative displacements between a key blank blade and a cutter wheel can electronically duplicate a defined bit notch pattern onto a key blank blade.

FIGS. 4 and 5 conceptually illustrate how a cutter wheel 40 connected to a motor driven cutter head 42 can be laterally displaced (X-axis displacements) by the axially displaceable threaded shaft 44 of lateral displacement element 46. As illustrated in FIG. 5, key 22 is clamped into a key positioning fixture 48 and is longitudinally displaced (Y-axis displacements) by the axially displaceable shaft 50 of longitudinal displacement element 52. As will be explained below, lateral and longitudinal displacement elements 46 and 52 typically take the form of computer-controlled linear actuators or stepper motors which effect rapid, precisely controlled displacements of their output shafts to generate precision X-axis and Y-axis displacements of the cutting edge of cutter wheel 40. As illustrated in FIGS. 4 and 5, such precise X and Y axis displacements of cutter wheel 40 can in response to appropriate position control signals be used to reproduce on a key blank a predetermined bit notch pattern stored as digital data in a database.

Figure 6:
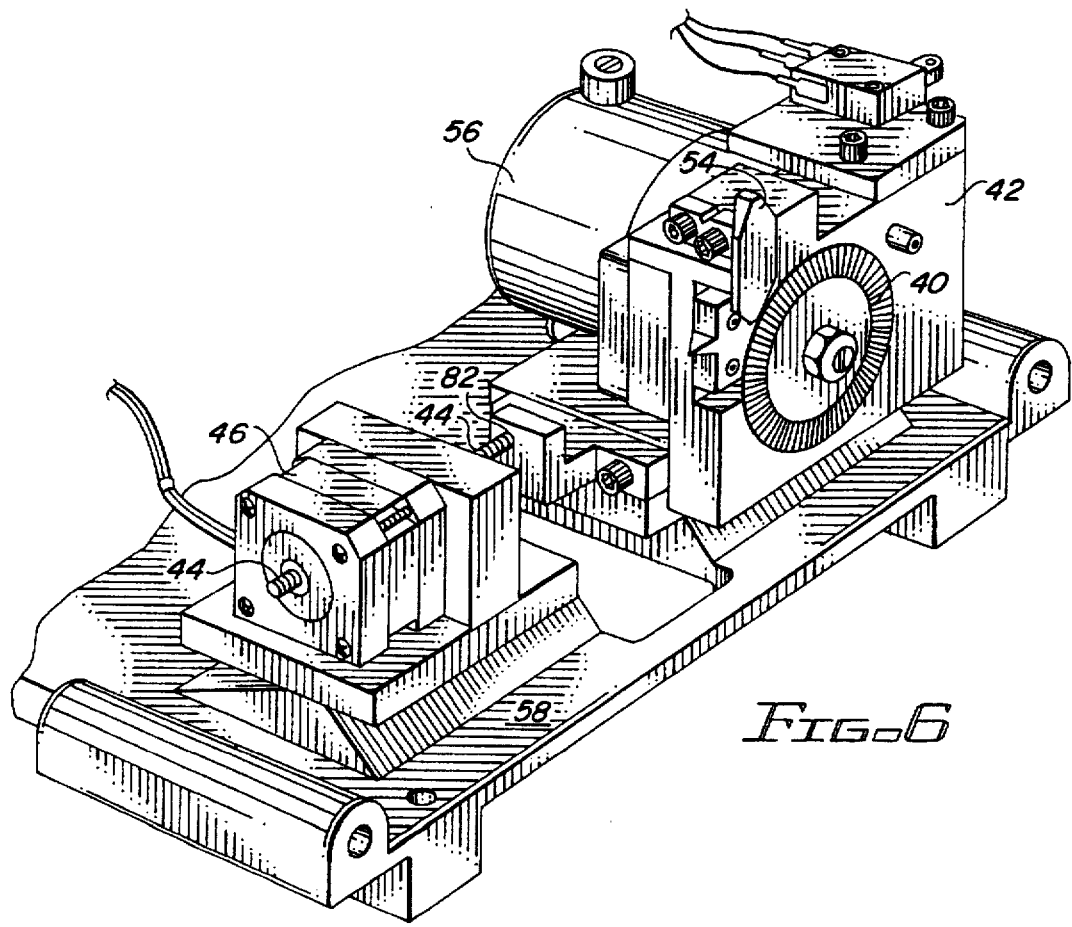
FIG. 6 represents a partially cutaway perspective view of the key cutting machine illustrated in FIG. 1A.
Figure 7:
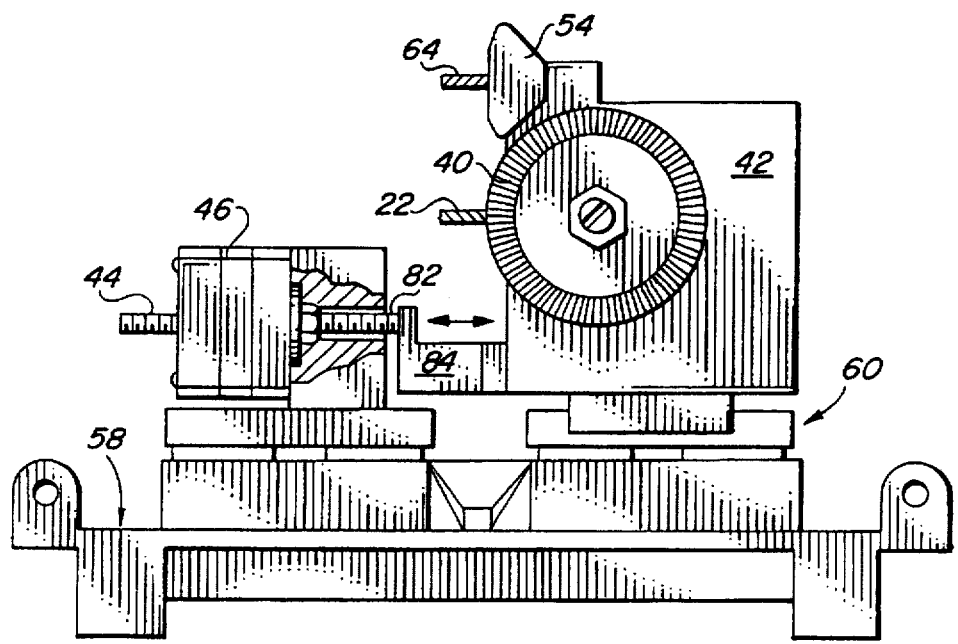
FIG. 7 represents a front elevational view of the key cutting machine illustrated in FIG. 6.
Figure 8:
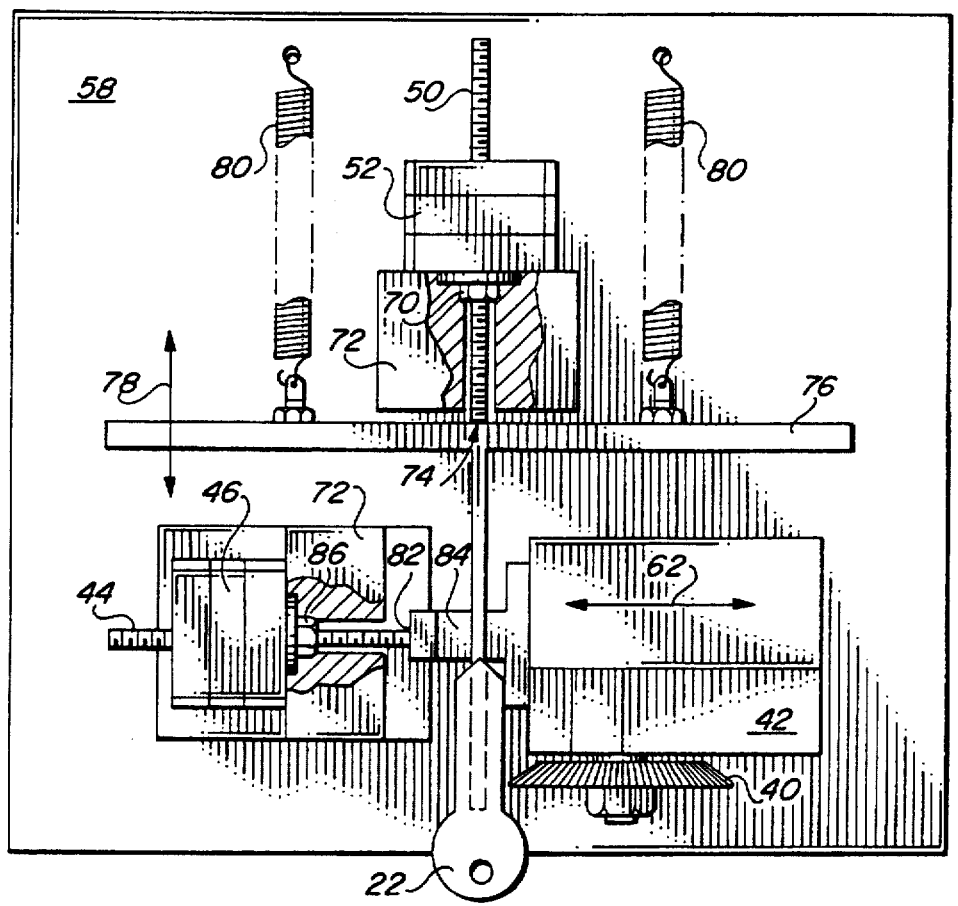
FIG. 8 represents a view from above of the key cutting machine illustrated in FIG. 7.

Referring now to FIGS. 6, 7 and 8, a preferred embodiment of the digitally controlled code cutting duplication aspect of the present invention will now be described in detail. This aspect of the present invention utilizes cutter head 42 having a key follower 54 and cutter wheel 40 which is rotated by drive motor 56. Cutter head 42 is coupled to key cutting machine base 58 by a linear bearing assembly 60 which as illustrated in FIG. 8 allows cutter head 42 to be displaced solely in a lateral or back and forth direction (X-axis displacements) as illustrated by reference number 62 to control the depth that the cutting edge of cutter wheel 40 penetrates into the blade of key blank 22. Linear bearing assembly 60 prevents any longitudinal or Y-axis displacements of cutter head 42 and includes an internal biasing spring which biases cutter head 42 into engagement with the blade of key blank 22. These structural elements of the key cutting machine are essentially identical to those illustrated and described in the '339 patent.

Although FIG. 7 illustrates a master key 64 maintained at a first elevation aligned with key follower 54, in the digital operating mode of the present invention, master key 64 is selected to avoid engagement with key follower 54 and instead serves the sole function of activating safety cutout switch 902 as illustrated in FIG. 18 of the '339 patent. To serve that purpose, in the digital operating mode, master key 64 takes the form of what is generally referred to as a false key having a reduced blade width to avoid engagement with key follower 54. In the digital operating mode, key follower 54 is effectively disabled.

Figure 19:
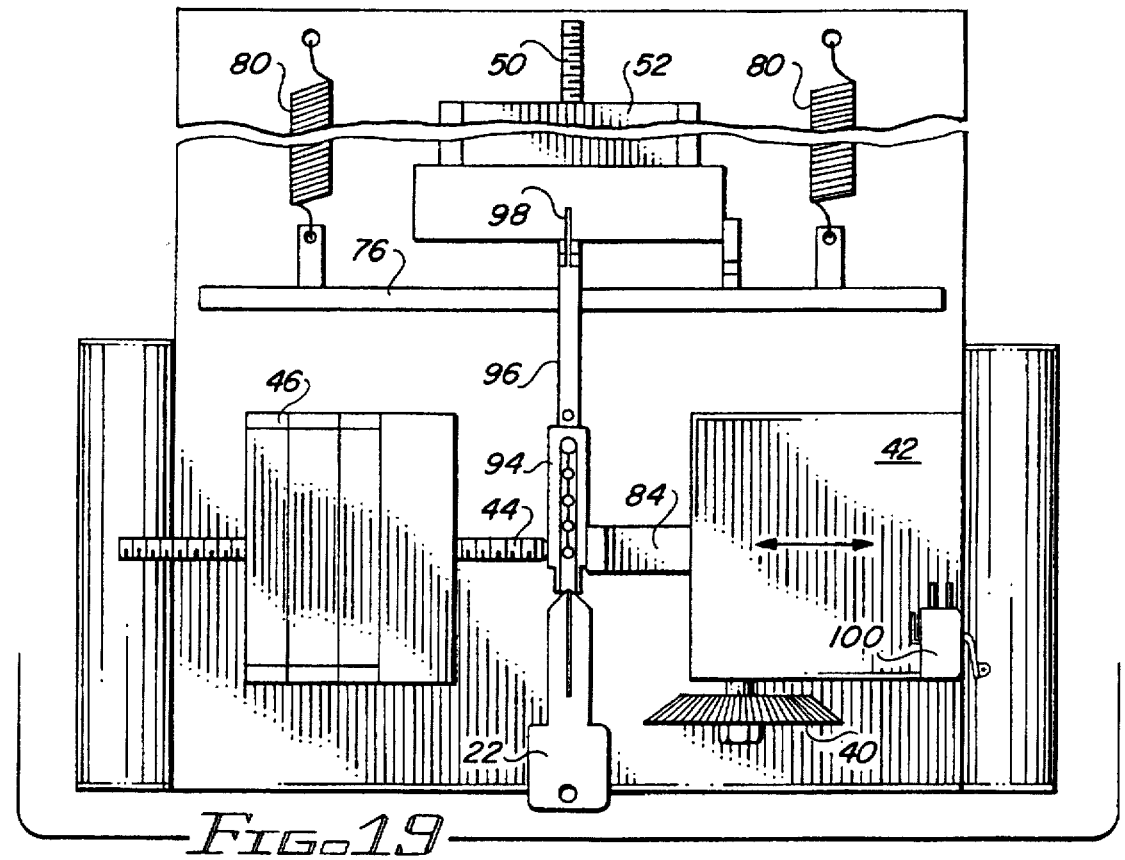
FIG. 19 illustrates the cutter head position sensing switch 100 being laterally displaced against the interior surface of forward case section 66 to calibrate the cutter head lateral position.

As illustrated in FIG. 19 of the '339 patent, in one embodiment of the invention, the forward section of the key cutting machine case designated by reference number 66 in FIG. 1A is longitudinally displaced along the Y-axis relative to the fixed position rear case section 68.

FIG. 8 illustrates that longitudinal or Y-axis displacement of the key retaining cassette 12 mounted in forward case section 66 is controlled by longitudinal displacement element 52 which in the preferred embodiment of the invention takes the form of a computer-controlled linear actuator such as a Size 7 NEMA linear actuator with 10–32 threads available from the Lin Engineering, 3509 Ryder Street, Santa Clara, Calif. The threaded shaft 50 or lead screw of actuator 52 extends from both ends of actuator 52 and is controlled by the rotary motion in first and second directions of what is essentially an internal threaded nut 70 which is part of the motor armature. A lead screw block 72 is configured to accept an anti-rotation pin the ends of which are seated within a pair of opposing notches which extend along the full length of block 72. The anti-rotation pin passes through the center of shaft 50. This pin/notch structure allows the anti-rotation pin to move longitudinally within block 72 without rotating to thereby prevent unwanted rotational motion of shaft 50. As a result, rotation of threaded nut 70 of actuator 52 in a first direction will cause threaded shaft 50 to be linearly displaced in a first direction while rotation of threaded nut 70 of actuator 52 in a second direction will linearly displace shaft 50 in the opposite direction.

The tip 74 of shaft 50 pushes against wall 76 which is coupled to base 58 such that unidirectional motion of wall 76 in the longitudinal or Y-axis direction as indicated by reference number 78 can be obtained. Springs 80 bias wall 76 against linear actuator 52 as illustrated in FIG. 8. Alternative, tip 74 of shaft 50 could be directly coupled to wall 76.

Although for clarity cassette 12 has not been shown in FIGS. 6, 7 and 8, as was the case with key cutting machine illustrated in the '339 patent, master key 64 and key blank 22 are retained in that cassette key positioning fixture and are longitudinally displaced relative to the fixed longitudinal position cutter head 42 during key duplication operations. Master key 64 is retained at a first elevation within a first key positioning fixture of cassette 12 while key blank 22 is retained at a second elevation within a second key positioning fixture within cassette 12. In the preferred embodiment of the invention, master key 64 and key blank 22 are longitudinally aligned relative to a single longitudinal reference point, are clamped at first and second elevations in a single cassette 12 and are longitudinally displaced together in that same cassette. A permanently installed key positioning fixture could be used to replace cassette 12 if reduced system versatility was acceptable.

As illustrated in FIGS. 1-15 of the '339 patent, cutter head 42 can be configured to be displaced both laterally and longitudinally relative to a fixed position key positioning fixture. The analog and digital key duplicating modes of the present invention are fully compatible with that alternative system design.

As illustrated in FIGS. 6, 7 and 8, the lateral displacement element of the present invention takes the form of a second linear actuator 46 which is essentially identical to linear actuator 52. Linear actuator 46 is rigidly coupled to base 58 and laterally displaces its shaft 44 relative to the X-axis. The tip 82 of shaft 44 abuts and pushes against bracket 84 which extends under cassette 12 and is coupled to the opposing side surface of cutter head 42. As was the case with actuator 52, shaft 44 of actuator 46 extends through lead screw block 72 which includes an anti-rotation pin for preventing rotary motion of shaft 44 as the threaded nut 86 of actuator 46 rotates in either a first or a second direction.

A feature critical to the dual mode operation of the present invention in either the key tracing or code cutting operating modes is the fact that tip 82 of shaft 44 of actuator 46 pushes against the vertical face of bracket 84 without being secured to or otherwise connected to bracket 84. In the digital code cutting mode of operation, electronic control unit 16 causes tip 82 of shaft 44 to engage the face of bracket 84 to allow actuator 46 to control the lateral back and forth or X-axis displacements of cutter head 42. In this digital operating mode, the biasing springs which spring bias cutter head 42 toward the machine centerline maintain firm, constant contact between bracket 84 and shaft tip 82. In the analog or key tracing mode of operation, electronic control unit 16 disables lateral displacement element 46 by moving the shaft 44 of actuator 46 to the left such that shaft tip 82 remains clear of and out of contact with the face of bracket 84. In this disabled configuration, key follower 54 engages the bit notch pattern of master key 64 and duplicates that bit notch pattern onto key blank 22 by laterally displacing cutter wheel 40 as key follower 54 and master key 64 are longitudinally displaced relative to each other. Actuator 52 continues to provide the necessary back and forth longitudinal or Y-axis relative displacement between master key 64 and key blank 22 and key follower 54 and cutter wheel 40.

Figure 36:
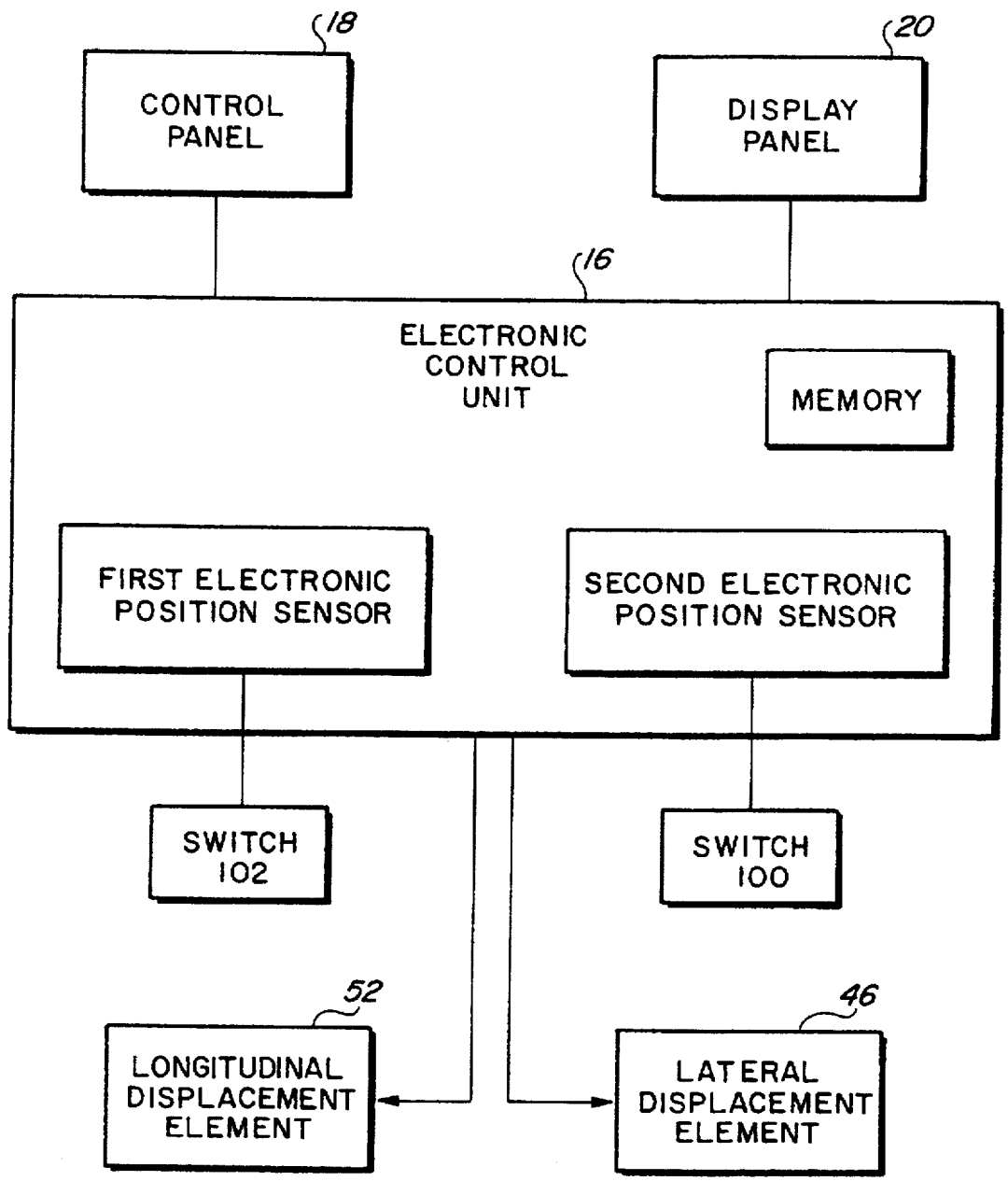
FIG. 36 represents an electrical schematic diagram of various elements of the electronic control unit.

FIG. 36 illustrates that the rotary position of threaded nuts 70 and 86 of linear actuators 52 and 46 is controlled on a one to one basis by the electronic drive signals generated by electronic control unit 16. Predetermined electrical output pulses from electronic control unit 16 produces predetermined and defined angular displacements of the linear actuator drive mechanism. As a result, as illustrated in the FIG. 36 block diagram, the microprocessor system of electronic control unit 16 can readily be programmed to perform the functions of first and second electronic position sensors which produce a cutter wheel position signal defining both the longitudinal and lateral position of the cutter wheel relative to the key blank blade continuously and on a real time basis. Accordingly, when operating in the digital mode, relative displacements between cutter wheel 40 and the blade of key blank 22 may be controlled in response to the cutter wheel position signal and a digital data signal which specifies the configuration of the selected or defined bit notch pattern designated by the appropriate key blank code. In the digital mode, electronic control unit 16 together with lateral displacement elements 46 and 52 operate as an open loop control system. As will be explained below position sensing switches 100 and 102 define the home or zero positions for the lateral and longitudinal axes of this open loop system.

Control panel 18 functions as a mode control system to command the key cutting machine to operate either in the analog mode to trace the bit notch pattern of master key 64 or to operate in the digital mode which drives linear actuator 46 to reproduce on the blade of key 22 the bit notch pattern defined by the digital data signal without tracing a master key bit notch pattern.

When operating in the digital mode, the following operating sequence should be implemented:

1. The operator enters the specific key blank style data in control panel 18 to designate the particular key blank number or style (e.g., H-52) which defines the shape and cut position of the appropriate bit notch pattern;

2. The operator then enters the series of code numbers which define the depth of each cut or flat in the bit notch pattern. During all such data entry operations, display 20 sequentially requests the appropriate information. When display panel 20 is prepared to receive the coded depth information, it displays a series of blanks identified by bit number to assist the operator during entry of the code numbers;

3. The display panel 20 next directs the operator to insert one of the available cassettes. The cassette selection is determined by the selected key blank style;

4. The display panel 20 then directs the operator to press the "#" or the "enter" button to start the code cutting key duplication process.

A variety of more specific structural and functional aspects of the digital operating mode of the present invention will now be described in detail to complete the detailed description of one embodiment of the invention.

As illustrated in FIG. 1A, the key cutting machine of the present invention configured for automotive applications currently requires the following styles of cassette 12:

A: Double-cut long blade length (tip gauged);
B: Double-cut short blade length (tip gauged);
C: Single-cut (singe-sided bit notch pattern) for Chrysler/ General Motors keys (shoulder gauged); and
D. Double-cut Chrysler key (tip gauged).

FIGS. 14 and 15 illustrate Cassette C which is capable of duplicating the bit notch pattern of a single-cut or single-sided Chrysler or General Motors key using a shoulder gauging longitudinal alignment technique. To provide such shoulder gauged longitudinal alignment, as illustrated in FIG. 15, cutter head 42 must be displaced to the left by actuator 46 and shaft 44 so that the edge of cutter wheel 40 is laterally aligned to engage shoulder 26 of key 22. FIG. 14 represents an elevational view depicting cutter head 42 and cutter wheel 40 displaced to the left such that the circumference of cutter wheel 40 is aligned with the lateral index axis designated by reference letter "A" to achieve longitudinal alignment by shoulder indexing.

Figure 13:
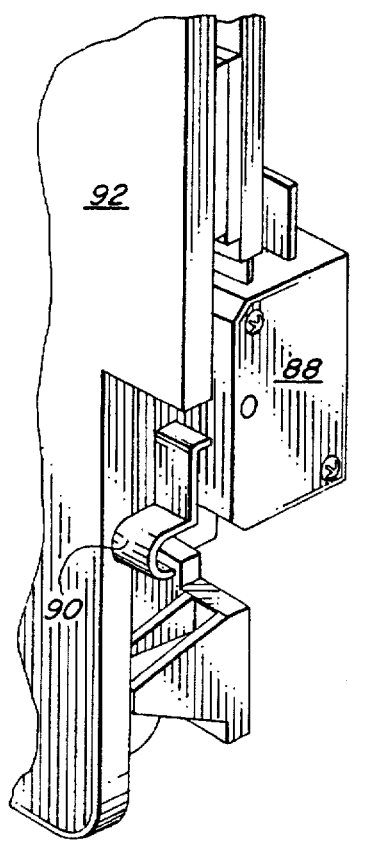
FIG. 13 illustrates a position sensing switch interfacing with the rear surface of a cassette to designate appropriate cutter head lateral indexing.

A specialized automatic key type sensing system is provided in the key cutting machine which provides an appropriate input signal to electronic control unit 16 to cause the required left to right shoulder indexing displacement of cutter head 42 as illustrated in FIGS. 14 and 15. Specifically, as illustrated FIGS. 11, 12 and 13, a microswitch key type sensing switch 88 includes a switch arm 90 which determines whether the rear, vertically oriented wall 92 of cassette 12 is closed as illustrated in FIGS. 11 and 12 or includes an opening or aperture for receiving switch arm 90 as illustrated in FIG. 13. When a cassette 12 having a closed end wall 92 as illustrated in FIGS. 11 and 12 is inserted into cassette receiving aperture 14, rear wall 92 displaces switch arm 90 and closes key type sensing switch 88. That switch output causes electronic control unit 16 to activate actuator 46 to laterally drive shaft 44 to position cutter head 42 with cutter wheel 40 aligned with axis A as illustrated in FIGS. 14 and 15 to allow cutter wheel 40 to be longitudinally indexed by shoulder 26. The lateral indexing function could alternatively be accomplished by use of information stored in memory pertaining to the specific key style entered by the user.

When a cassette 12 having an opening in end wall 92 as illustrated in FIG. 13 is inserted through cassette receiving aperture 14, switch arm 90 of key style sensing switch 88 remains in the closed or unactuated configuration causing electronic control unit 16 to laterally drive cutter head 42 into the X-axis position "B" as illustrated in FIGS. 16 and 17. In that double cut key longitudinal indexing position, cutter head 42 is driven toward the right such that the circumference of cutter wheel 40 and the edge of key follower 54 are laterally aligned with vertical axis "B" as illustrated in FIG. 16. In that configuration, a double-sided key blank which is tip-indexed rather than shoulder indexed may as illustrated in FIG. 17 be fully inserted into the cassette key receiving aperture without being longitudinally aligned by engagement with the edge of cutter wheel 40 which has been moved out of the way.

Figure 18A:
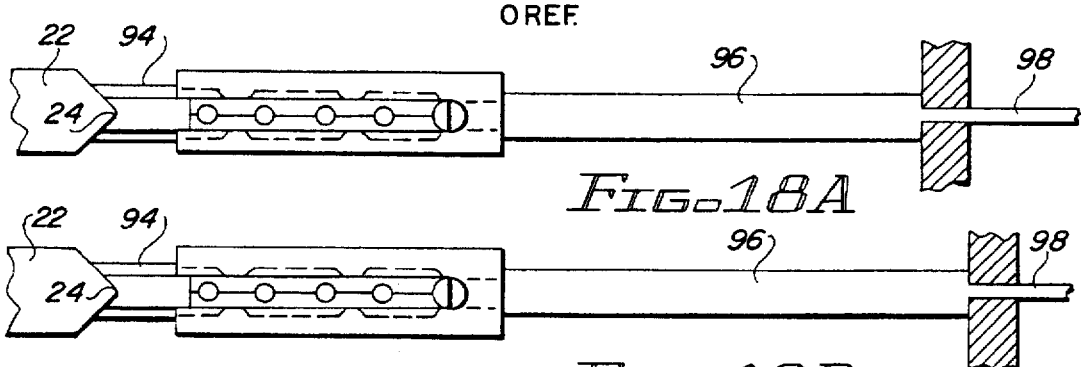
FIGS. 18A and 18B illustrate two forms of longitudinal indexing by tip indexing.

FIG. 18A illustrates the manner in which tip 24 of double-sided key 22 engages indexing plunger 94. The opposite end of indexing plunger 94 includes a larger diameter section 96 and a smaller diameter section 98 which passes through an aperture in cassette end wall 92. The machine operator inserts the blade of key 22 through the key receiving aperture in cassette 12 until the larger diameter end section 96 of indexing plunger 94 abuts end wall 92 as illustrated in FIG. 18A. That procedure longitudinally aligns a short blade length double-sided Ford key as illustrated in FIG. 18A.

Figure 18B:
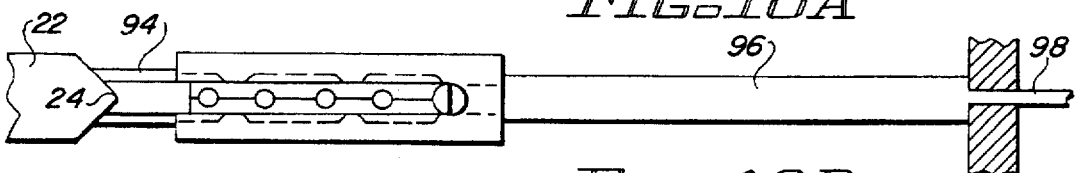

FIG. 18B illustrates the configuration of Cassette A which longitudinally indexes by a tip indexing procedure a double-cut long Ford key blank.

Figure 20:
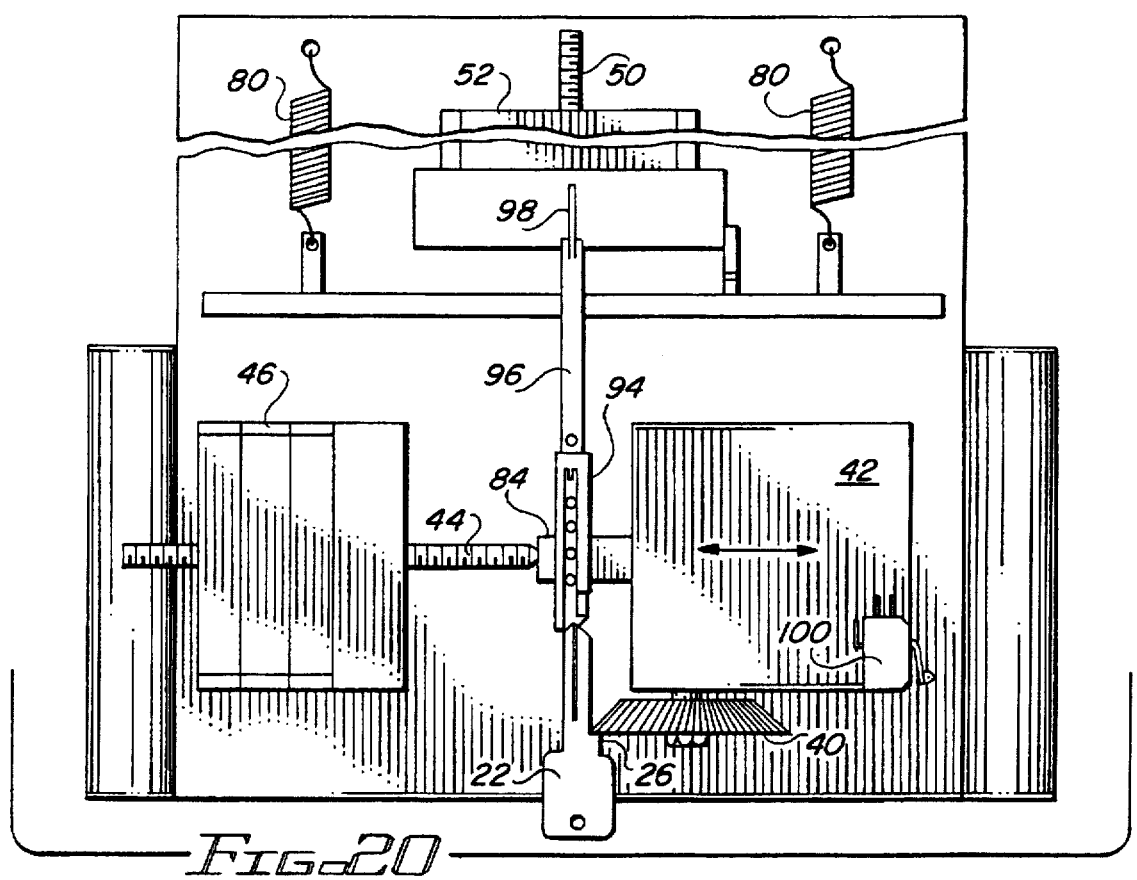
FIG. 20 illustrates the FIG. 19 key cutting machine just prior to commencement of the bit notch pattern duplicating process.
Figures 24C, 24D:
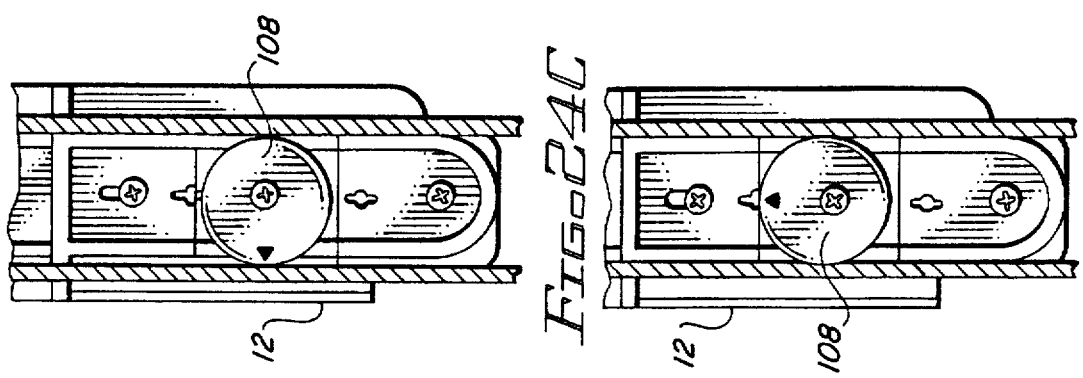
FIGS. 24B, 24C and 24D illustrate the rear end surface of cassette 12 illustrated in FIG. 24A showing different adjustments for the cassette tail lateral offset adjusting cam.

FIG. 20 represents a view from above of a single-sided key being shoulder indexed by causing shoulder 26 of key 22 to abut and be longitudinally indexed by the circumference of cutter wheel 40.

See also FIGS. 27, 28, 29, 36, 37, 39, 40 and 41 of the '339 patent together with the related written description for a more detailed explanation of longitudinal alignment of the master key and key blank by shoulder indexing or tip indexing procedures.

Figure 21:
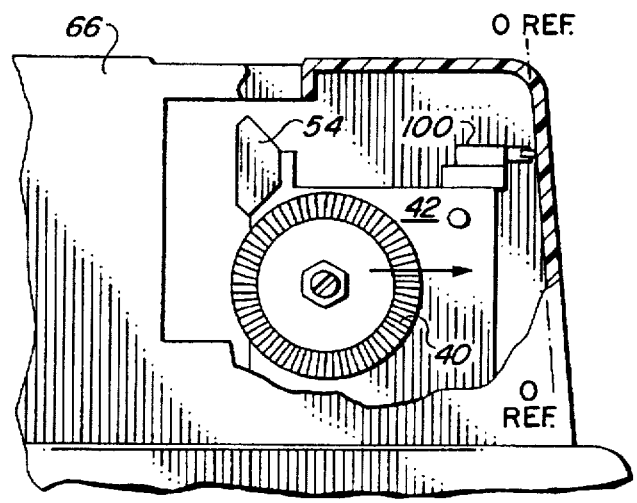
FIG. 21 represents a partially cutaway side elevational view of the key cutting machine illustrated in FIGS. 1A and 20 showing the cutter head position sensing switch which is used to establish a longitudinal axis calibration or reference point.

When operating in the digital mode, the key cutting machine of the present invention must automatically align itself relative to defined reference points for the X-axis or lateral position and for the Y-axis or longitudinal position. This automatic alignment procedure is repeated at machine start-up and every time a cassette is changed. FIGS. 19 and 21 illustrate that the X-axis electronic alignment is achieved by utilizing a microswitch position sensing switch 100 coupled to the upper right hand edge of cutter head 42. Cutter head 42 is displaced to the right by lateral displacement element 46 until switch arm of position sensing switch 100 engages and is closed by the interior side wall of forward case section 66. That switch closure electronically locates the "0" reference point for the X-axis. The location of that "0" X-axis reference point or home position is used by the microprocessor. Cut depth calibration can then be adjusted based on this "0" X-axis reference position.

Figure 23:
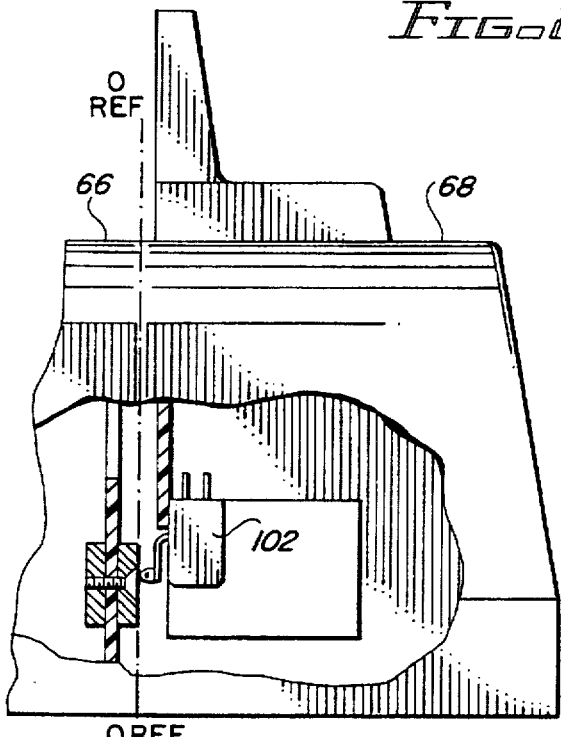
FIG. 23 represents a partially cutaway side elevational view of the key cutting machine of FIG. 1A, showing position sensing switch 102 which assists in longitudinally aligning the longitudinal displacement element.

As illustrated in FIG. 23, position sensing switch 102 is coupled to a wall of rear case section 68. The arm of position sensing switch 102 is configured to engage and produce a Y-axis calibration relative to a fixed reference point on forward case section 66 prior to implementing any key duplication operations. The Y-axis position where position sensing switch 102 is actuated by forward case section 66 locates the Y-axis "0" reference position and serves as the Y-axis reference point for subsequent key duplication operations. The location of that Y-axis reference point is used by the microprocessor to control the lateral displacement element.

The microprocessor-based electronic control unit 16 together with position sensing switches 100 and 102 allow the X and Y axis reference points of the laterally and longitudinally displacement elements of the present invention to be periodically recalibrated to compensate for mechanical tolerance build-ups which result from the relatively complex assembly of mechanical components which form an essential element of the present invention.

The system of the present invention also includes a software calibration technique performed at the factory at the completion of initial system fabrication and in the field whenever a system component is replaced. This software calibration technique completely zeroes out X and Y axis errors for each key cutting machine system to reduce mechanical bit notch pattern cutting errors to within a controllable tolerance. This software calibration technique is implemented actuating the key cutting machine to cut a predefined test pattern in the form of a selected bit notch pattern onto a standard key blank blade. The results of this preliminary test pattern cutting are then physically compared with a known zero tolerance standard bit notch pattern. The X and Y axis errors between the test cut and the reference or standard bit notch pattern are measured to compute the lateral and longitudinal position errors of the test pattern bit notch pattern relative to the reference bit notch pattern.

Based on those measurements, X and Y axis error corrections are programmed into the software to zero out both the lateral position error as well as the longitudinal position error. After the software calibration data has been entered, the bit notch pattern cutting test is repeated and the bit notch pattern of the resulting duplicated key blank is once again compared to the standard bit notch pattern. An additional comparative measurement is performed and any uncompensated errors are zeroed out by programming an appropriate software position error correction. The software error correction data essentially directly translates into a plus or minus position correction which directly correlates with the error measured between the test cut and the reference cut relative to the X and Y axes. Utilization of this software error correction technique in combination with the self-contained X and Y axis zero or home position sensing provided by position sensing switches 100 and 102 allows the bit notch pattern duplication errors to be reduced to essentially zero during the digital operating mode of the present invention.

Referring now to FIGS. 22A, 22B and 24A–D, a factory adjustment for aligning the tail of each cassette 12 with the longitudinal key cutting axis will now be described.

Figure 22B:
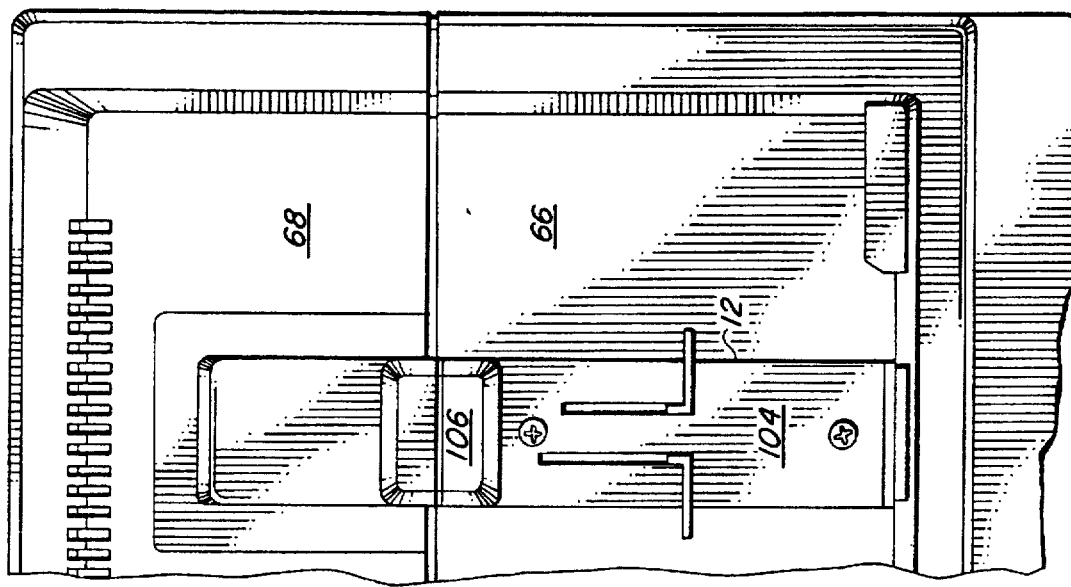
FIG. 22B illustrates the cassette 12 of FIG. 22A with the tail repositioned into an aligned position.
Figure 22A:
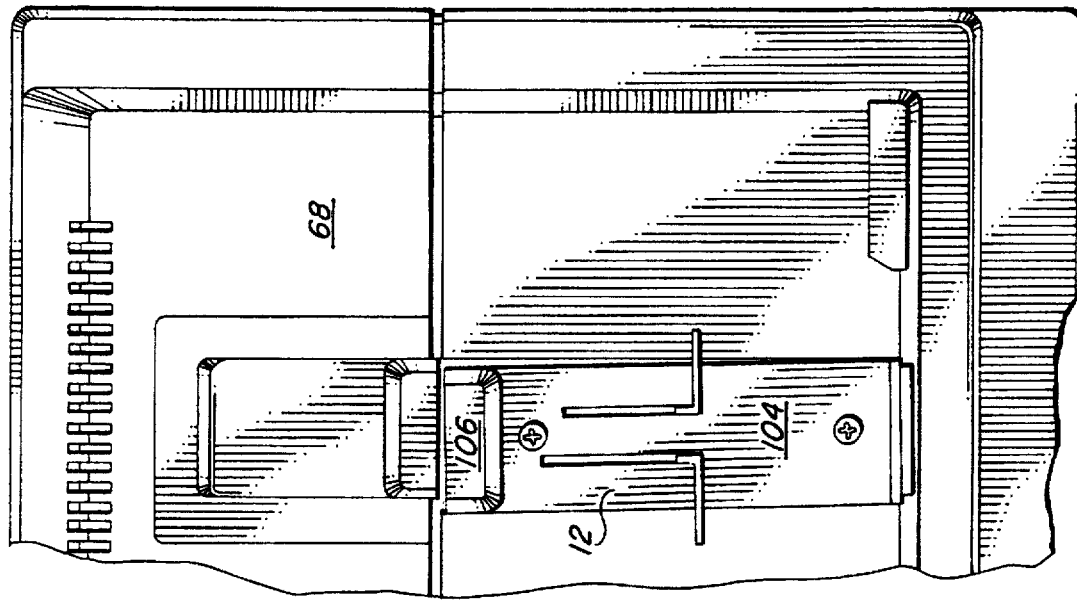
FIG. 22A represents a partially cutaway view from above of the key cutting machine illustrated in FIG. 1A showing the tail of cassette 12 in a misaligned condition.
Figure 24A:
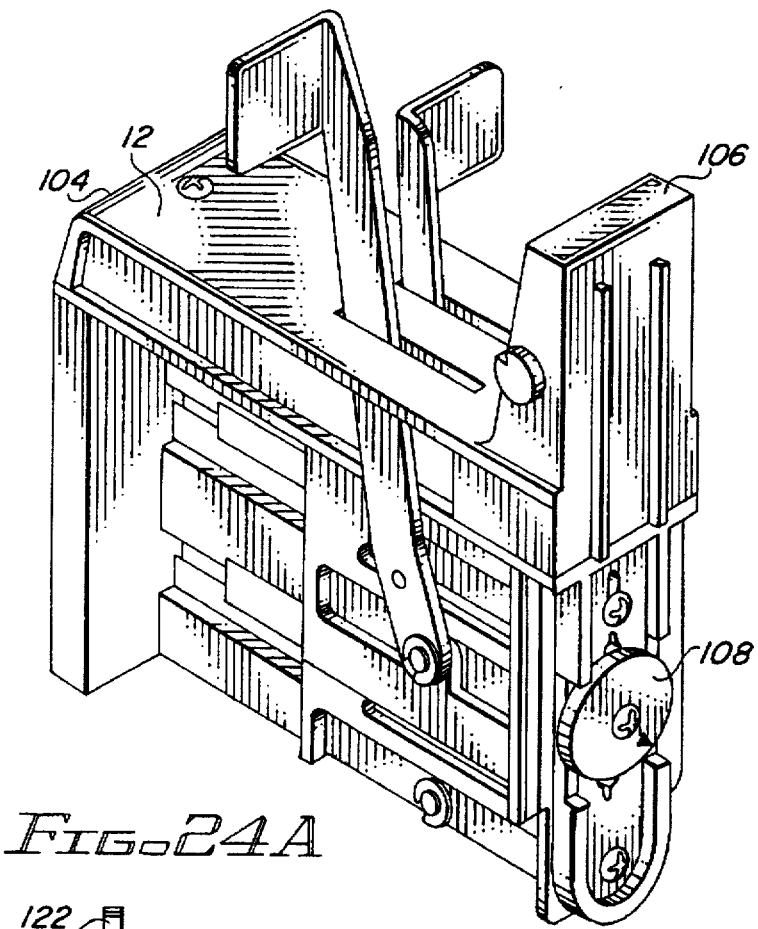
FIG. 24A represents an enlarged perspective view of the key retaining cassette 12 of the present invention.
Figure 24B:
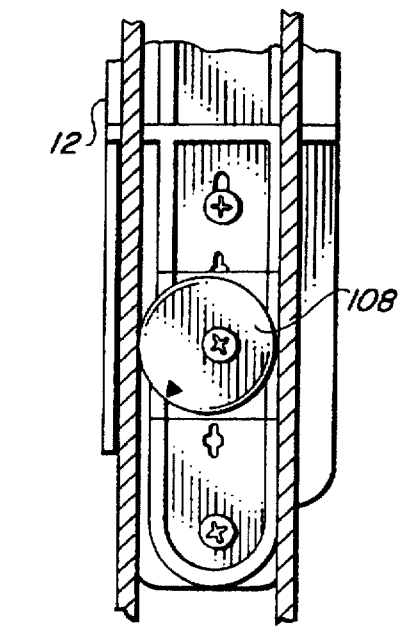

Front end 104 of cassette 12 is firmly biased to the left as illustrated in FIG. 22A by internal upper and lower spring loaded plungers (not shown) which include ball-shaped end sections for engaging the right side wall of cassette 12 as it is inserted through cassette receiving aperture 14. Those two spring loaded plungers continuously operate against the front upper and lower side surfaces of the right wall of the cassette to bias the left wall of the cassette into a required "0" reference position for cassette front end 104. The rear or tail end 106 of the cassette 102 is laterally aligned by an adjustable cam 108 located in the center of the cassette end wall as illustrated in FIGS. 24 A–D. Rotation of eccentric cam 108 laterally displaces the tail end 106 of cassette 12 between the side wall of cassette receiving aperture 14 such that cassette tail end 106 can be laterally displaced from the out of alignment configuration illustrated in FIG. 22A into the aligned configuration illustrated in FIG. 22B. Cam 108 is typically adjusted at the factory and does not normally require readjustment in the field.

The '339 patent discloses a key cutting machine having a pair of cutter heads which provide for simultaneous duplication of bit notch patterns on both sides of the blade of a double-sided key. See FIGS. 16, 22A and 22B of the '393 patent. In the embodiment of the invention described above and as illustrated for example in FIG. 6, only a single cutter head 42 has been described and illustrated. To simultaneously duplicate both bit notch patterns of a double-sided key such as a Ford ignition key using the FIG. 6 embodiment of the invention, and whether operating in the analog or digital modes, one of the bit notch patterns must be duplicated, the key must be rotated 180° and the key cutting process must be repeated.

In the dual cutter head embodiments of the invention illustrated in FIGS. 25, 26, 27 and 28, a pair of cutter heads 42 in combination with a pair of opposing lateral displacement elements or actuators 46 have been provided to achieve simultaneous analog or digital duplication of both bit notch patterns of a double-sided key.

In the FIG. 25, 26 embodiment, shaft 44 of left actuator 46 engages a bracket 110 which is coupled to the right cutter head 42. Similarly, shaft 44 of right actuator 46 engages bracket 112 which is coupled to the left cutter head 42.

In the FIG. 27, 28 embodiment of the invention, shaft 44 of left actuator 46 is coupled to engage and push bracket 114 which is coupled to left cutter head 42. Shaft 44 of right actuator 46 is coupled to engage and push bracket 116 which is coupled to the right cutter head 42.

In the FIG. 25, 26 and FIG. 27, 28 embodiments of the invention utilizing a pair of opposing cutter heads, the key cutting machine while operating either in the analog mode or in the digital mode will simultaneously duplicate both bit notch patterns of a double-sided key.

In FIGS. 29–35, the key cutting machine system of the present invention has been implemented as a retrofit for a prior art key cutting machine configuration. In the embodiment illustrated in FIGS. 29–32, motor 56 is rigidly mounted to base 58. Cutter wheel 40 is rotatably coupled to mounting bracket 118 which is similarly rigidly mounted to base 58. Key blank 22 is rigidly coupled to second key positioning fixture 122 of key positioning fixture 120 and is manually aligned by the operator to properly index with and engage the cutting edge of cutter wheel 40. The overall key positioning fixture 120 includes a second key positioning fixture 122 which clamps key blank 22 in a longitudinally indexed location relative to cutter wheel 40. Key positioning fixture 120 also includes a key positioning fixture 124 which in the digital operating mode retains an identical key blank 126 which is similarly indexed to and aligned with key follower 128. In the analog operating mode, fixture 124 holds a master key having a bit notch pattern to be duplicated by tracing.

Figure 31A:
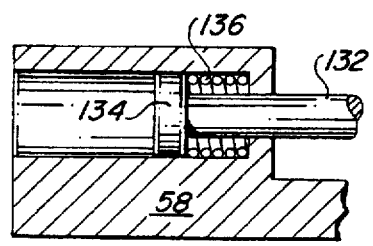
FIG. 31A illustrates a partially cutaway sectional view of the left end of the key positioning fixture illustrated in FIG. 29.
Figure 31B:
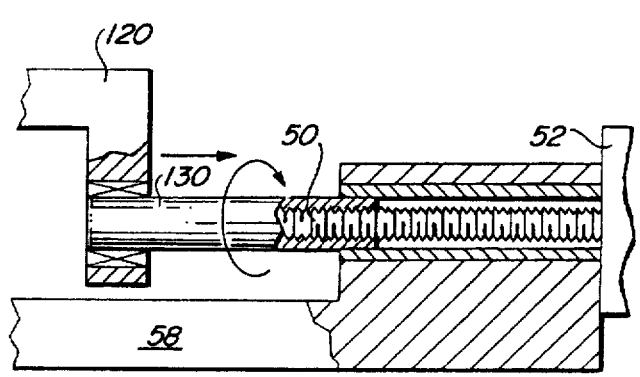
FIG. 31B illustrates a partially cutaway sectional view of the right end of the key positioning fixture illustrated in FIG. 29.

The right side of key positioning fixture 120 is coupled to an internally threaded tube 130 which receives threaded drive shaft 50 of actuator 52. As illustrated in FIGS. 30A and 30B, rotation of shaft 50 in a predetermined direction telescopes threaded tube 130 relative to shaft 50 and longitudinally displaces key positioning fixture 120 to the right. The opposite end of key positioning fixture 120 is coupled to tube 132. A piston 134 engages a spring 136 which biases tube 132 to the left as illustrated in FIGS. 30A, 30B and 31A.

Figure 32:
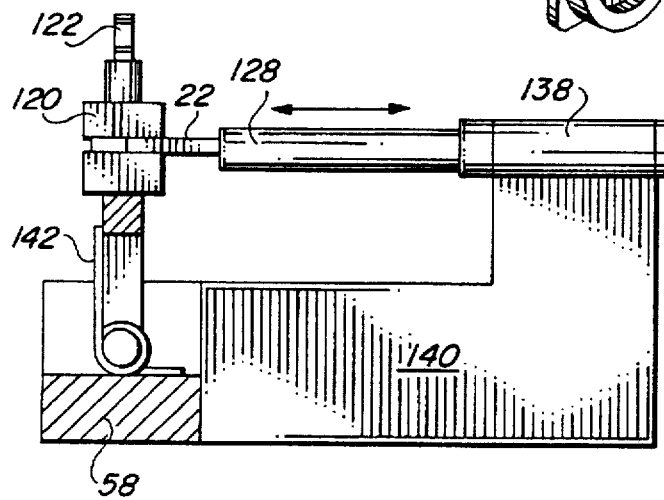
FIG. 32 represents an enlarged, partially cutaway side elevational view of the key cutting machine illustrated in FIG. 29.
Figure 35A:
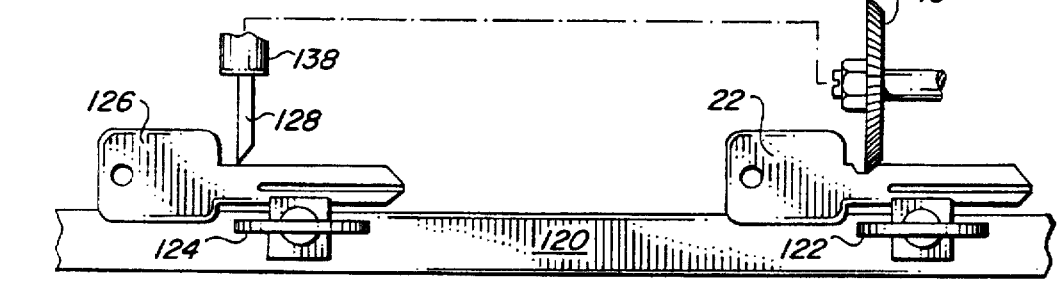
FIGS. 35A, B and C illustrate the various positions of the lateral displacement element of the key cutting machine embodiments illustrated in FIGS. 29 and 33, showing the manner in which such variable positions modify the cutting depth of the cutter wheel relative to the key blank blade.
Figure 35B:
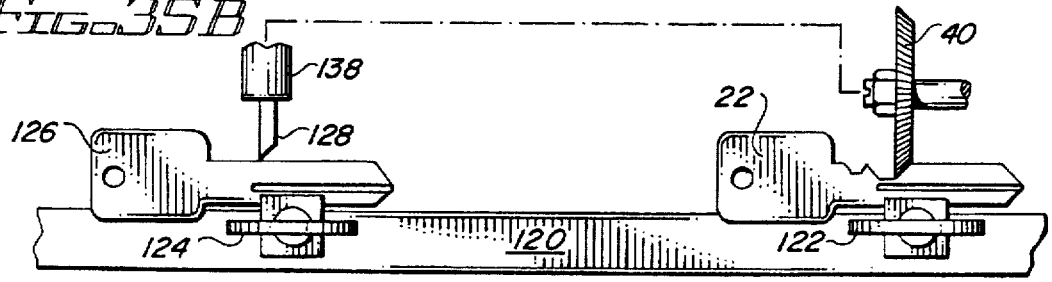
Figure 35C:
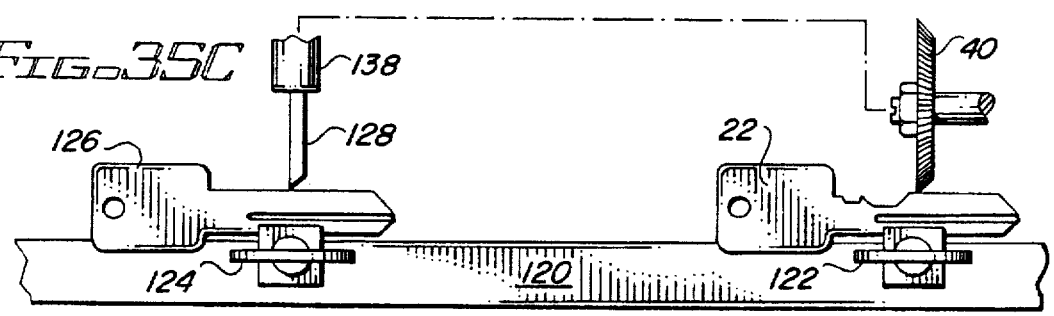

As illustrated in FIGS. 29 and 32, threaded output shaft 44 of actuator 46 passes through an internally threaded tube 138 which is coupled above a bracket 140 which is rigidly coupled to base 58 and which supports actuator 46. Appropriate rotary motion of actuator 46 displaces shaft 44 either outward or inward to control the lateral or X-axis position of key follower 128. As illustrated in FIGS. 35A, B and C, outward displacements of shaft 44 deflect key positioning fixture 120 away from cutter wheel 40 to decrease the cutting depth on key blank 22. Displacements of shaft 44 toward actuator 46 as illustrated in FIG. 35C decreases the distance between key positioning fixture 120 and key blank 22, effectively displacing key blank 22 relative to the X-axis toward cutter wheel 40 and increasing the cutting depth as illustrated in FIG. 35B.

In the FIG. 29–32 embodiment of the invention, actuator 46 controls the X-axis or lateral displacement of key blank 22 relative to cutter wheel 40 while actuator 52 controls the Y-axis or longitudinal displacement of key blank 22 relative to cutter wheel 40. As illustrated in FIGS. 29 and 32, spring 142 rotationally biases key positioning fixture 120 toward and in contact with key follower 128 and maintains the blade of key blank 22 in firm engagement with the cutting edge of cutter wheel 40.

In the analog operating mode, electronic control unit 16 displaces shaft 44 into a calibrated, fixed X-axis position enabling key follower 128 to function as a standard key follower which traces the bit notch pattern of a master key. In the digital operating mode, key 126 must have an uncut linear blade surface to provide the necessary reference surface for key follower 128 which is displaced by actuator 46 to control the cutting depth of cutter wheel 40.

Figure 34:
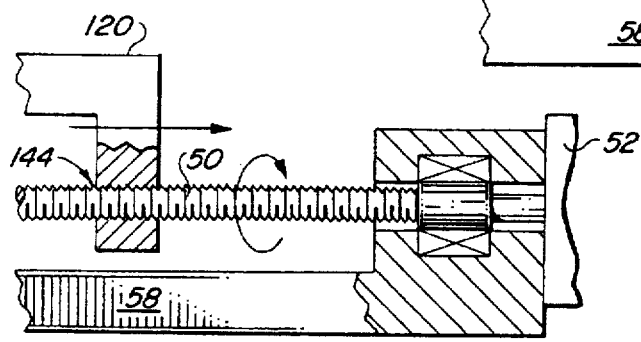
FIG. 34 represents a partially cutaway sectional view of the right hand end of the key positioning fixture illustrated in FIG. 33.

FIGS. 33 and 34 illustrate a slightly modified embodiment of the key cutting machine illustrated in FIGS. 29–32. In this modified embodiment of the invention, threaded output shaft 50 of actuator 52 extends across the full width of base 58 and passes through the threaded end sections 144 of key positioning fixture 120. In this embodiment of the invention, shaft 50 of actuator 52 rotates in either a first or a second direction to longitudinally translate key positioning fixture 120 relative to shaft 50.

Figure 37:
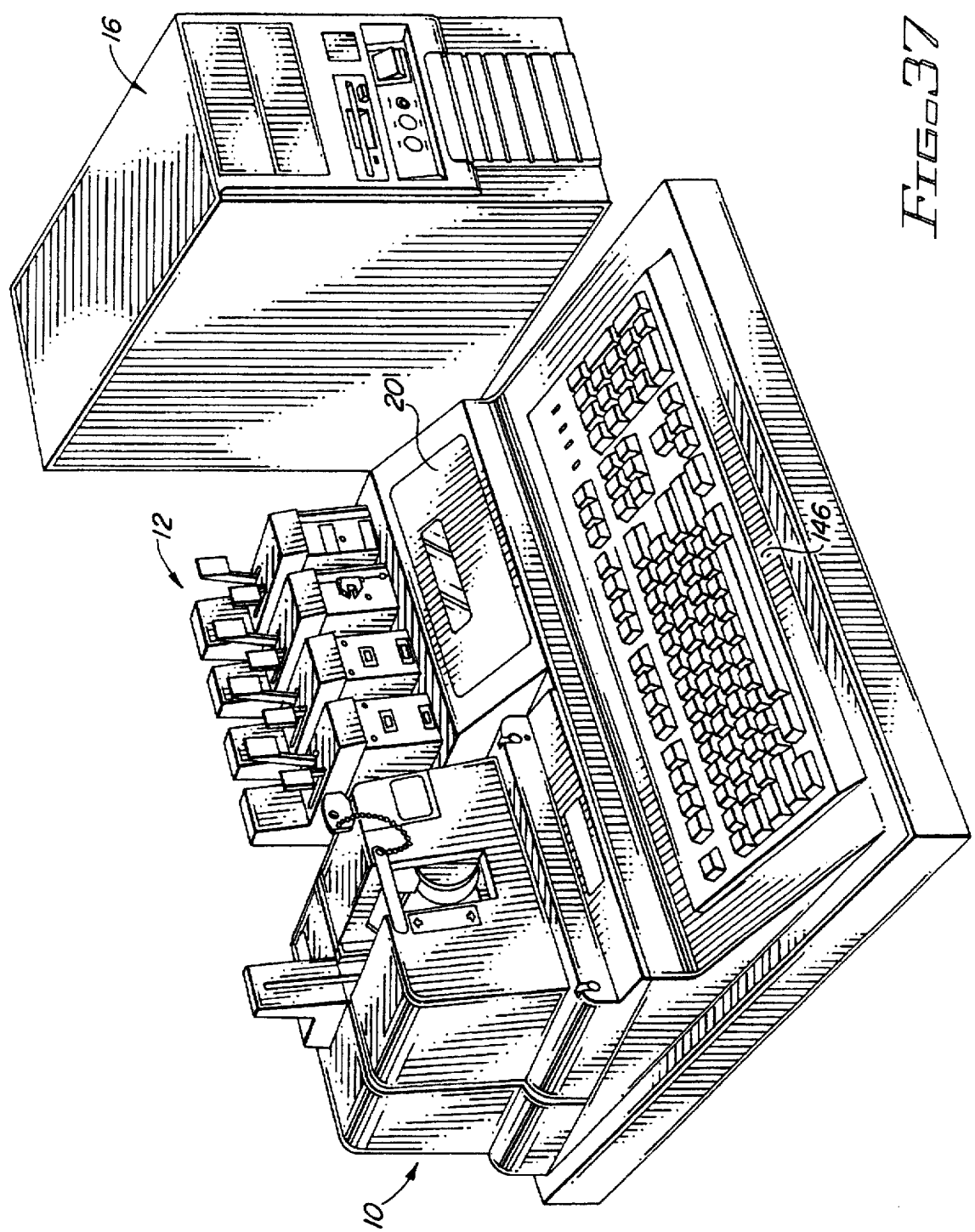
FIG. 37 depicts another embodiment of the invention in which many of the electronic elements of the invention are housed in a separate enclosure and the system includes a full keyboard.

FIG. 37 illustrates another embodiment of the key cutting machine of the present invention in which electronic control unit 16 takes the form of a stand alone personal computer system having at least a 286 microprocessor. A standard computer keyboard 146 replaces control panel 18 in the FIG. 1A embodiment of the invention and provides full alpha/numeric input to the personal computer-based electronic control unit 16. In the FIG. 37 embodiment of the invention, the drivers for lateral displacement element 46 and longitudinal displacement element 52 are also housed in the enclosure for electronic control unit 16. As shown in FIG. 37, electronic control unit 16 includes a 3.5 inch disc drive which allows the data stored in the electronic control unit to be updated or to provide a customized data base of key bit notch patterns for selected users. A system could readily be updated in the field to provide additional data relating to recently released key styles for specific users.

Because of the enhanced computer processing capabilities of the expanded electronic control unit 16 illustrated in FIG. 37, the secondary database required to convert key codes into bit notch position and depth readings can be processed internally by the system rather than requiring the user to refer to a proprietary secondary decoding source. Accordingly, the FIG. 37 embodiment of the invention can readily provide key cutting operations based on 1) the analog or tracing mode, 2) the direct entry of key code data, or 3) the entry of an appropriate sequence of bit notch depths.

Because the standard personal computer keyboard 146 accepts full alpha/numeric inputs, the alpha/numeric data in which key codes are typically expressed can be readily input into electronic control unit 16 by the user. With the more limited control panel 18 as illustrated in the FIG. 1A, 1B embodiment of the invention, the alphabetical data incorporated in typical key codes could not be directly entered into electronic control unit 16. Similarly, due to the more limited processing and memory storage capabilities of the FIG. 1 embodiment of the invention, the data required to convert alpha/numeric key code data into appropriate bit notch depth entries could not readily be accommodated by that more limited system.

While a variety of embodiments of the key cutting machine of the present invention having the capability of operating in either analog or digital key duplicating modes have been described, numerous other different embodiments of the invention would be readily apparent to a person of ordinary skill in the art based on the disclosure and description of the operating principles of the invention as stated above. For example, an alternative linear displacement element having a rotating shaft with a fixed drive nut could be used for the linear and lateral displacement elements. In that embodiment, the nut would be restricted from rotation by being pinned in a fixed angular position or by travelling in a nut-shaped track within a fixed tube. Similarly, the design could be simplified by eliminating the group of interchangeable cassettes 12 and cassette receiving aperture 14. Instead, a single integral key positioning fixture could be provided. Accordingly, it is intended by the appended claims to cover all such modifications of the invention which fall within the true spirit and scope of the invention.

We claim:

1. A key cutting machine having a longitudinal axis and a lateral axis for cutting a defined bit notch pattern into a key blank having a longitudinal axis and a lateral axis, a length, a blade for receiving the defined bit notch pattern, and a tip, wherein the configuration of the defined bit notch pattern is specified either by a digital data signal or by a bit notch pattern in a blade of a master key having a longitudinal and a lateral axis, the key cutting machine comprising:

a. a cutter wheel;
   b. a key follower spaced apart from the cutter wheel;
   c. a motor for rotating the cutter wheel;
   d. a key positioning fixture including
      i. a first key positioning fixture for aligning the longitudinal and lateral axes of the master key with the longitudinal and lateral axes of the key cutting machine and for defining first longitudinal and lateral index positions relative to the master key blade and for aligning the master key bit notch pattern and the key blank blade relative to each other;
      ii. a second key positioning fixture for aligning the longitudinal and lateral axes of the key blank with the longitudinal and lateral axes of the key cutting machine and for defining second longitudinal and lateral index positions relative to the key blank blade;
   e. a longitudinal displacement element for longitudinally displacing the cutter wheel and the key blank blade relative to each other;
   f. a first electronic position sensor for measuring the longitudinal position of the cutter wheel relative to the second longitudinal index position and for generating a cutter wheel longitudinal position signal which defines the longitudinal position of the cutter wheel relative to the key blank blade;
   g. a lateral displacement element for laterally displacing the cutter wheel and the key blank blade relative to each other;
   h. a second electronic position sensor for measuring the lateral position of the cutter wheel relative to the second lateral index position and for generating a cutter wheel lateral position signal which defines the lateral position of the cutter wheel relative to the key blank blade; and
   i. a mode control system for selectively operating the key cutting machine in either
      i. an analog mode in which the lateral displacement element is disabled and in which the key follower engages the master key bit notch pattern and laterally displaces the cutter wheel and the key blank blade relative to each other as the key follower and the master key blade are longitudinally displaced relative to each other to mechanically trace and duplicate the master key bit notch pattern in the key blank blade; or
      ii. a digital mode in which the lateral displacement element laterally displaces the cutter wheel and the key blank blade relative to each other in response to the digital data signal and the longitudinal and lateral cutter wheel position signals as the cutter wheel and the key blank blade are longitudinally displaced relative to each other to electronically duplicate the defined bit notch pattern in the key blank blade without reference to the master key bit notch pattern.

2. The key cutting machine of claim 1 wherein the first longitudinal index position coincides with the second longitudinal index position.

3. The key cutting machine of claim 2 wherein the first lateral index position coincides with the second lateral index position.

4. The key cutting machine of claim 1 wherein the cutter wheel, the key follower and the motor are attached to a cutter head.

5. The key cutting machine of claim 4 wherein the key follower is positioned at a first elevation and the cutter wheel is positioned at a second elevation.

6. The key cutting machine of claim 5 wherein the longitudinal displacement element longitudinally displaces the key positioning fixture and the longitudinal position of the cutter head is fixed.

7. The key cutting machine of claim 6 wherein the cutter head is laterally displaceable relative to the key positioning fixture and includes a mechanism for biasing the cutter head toward the key positioning fixture.

8. The key cutting machine of claim 7 wherein the cutter head is positioned on a first side of the key positioning fixture and wherein the lateral displacement element is positioned on a second side of the key positioning fixture.

9. The key cutting machine of claim 8 wherein the lateral displacement element includes a variable position output shaft having a tip which contacts and pushes against but is not secured to the cutter head.

10. The key cutting machine of claim 9 wherein the lateral displacement element is disabled when the mode control system operates the key cutting machine in the analog mode by positioning the tip of the output shaft into a retracted position where the tip cannot contact or push against the cutter head.

11. The key cutting machine of claim 10 wherein the tip of the lateral displacement element output shaft remains in contact with the cutter head and disables the key follower when the mode control system operates the key cutting machine in the digital mode.

12. The key cutting machine of claim 9 wherein the lateral displacement element includes a stepper motor.

13. The key cutting machine of claim 9 wherein the lateral displacement element includes a linear actuator.

14. The key cutting machine of claim 5 wherein the key positioning fixture includes a removable cassette and wherein the first key positioning fixture is positioned within the cassette at a first elevation and wherein the second key positioning fixture is positioned within the cassette at a second elevation.

15. The key cutting machine of claim 14 wherein the first key positioning fixture is configured to establish the first longitudinal index position by referencing the tip of the master key and wherein the second key positioning fixture is configured to establish the second longitudinal index position by referencing the tip of the key blank.

16. The key cutting machine of claim 14 wherein the first key positioning fixture is configured to establish the first longitudinal index position by referencing the shoulder of the master key and wherein the second key positioning fixture is configured to establish the second longitudinal index position by referencing the shoulder of the key blank.

17. The key cutting machine of claim 1 wherein the cutter wheel, the key follower and the motor are mounted to a base.

18. The key cutting machine of claim 17 wherein the key positioning fixture allows the key blank to be either laterally or longitudinally displaced relative to the cutter wheel.

19. The key cutting machine of claim 18 wherein the longitudinal displacement element longitudinally displaces the key blank relative to the cutter wheel.

20. The key cutting machine of claim 19 wherein the lateral displacement element laterally displaces the key blank relative to the cutter wheel.

21. The key cutting machine of claim 20 wherein the first and second key positioning fixtures are positioned at the same elevation and are located at spaced apart intervals along the key positioning fixture.

22. The key cutting machine of claim 21 wherein the cutter wheel and the lateral displacement element are located on a first side of the key positioning fixture.

23. The key cutting machine of claim 22 wherein the key positioning fixture further includes a biasing mechanism for biasing the cutter wheel toward the key blank blade.

24. The key cutting machine of claim 23 wherein the lateral and longitudinal displacement elements include stepper motors.

25. The key cutting machine of claim 23 wherein the lateral and longitudinal displacement elements include linear actuators.

26. The key cutting machine of claim 9 wherein the key positioning fixture includes a first side and a second side and wherein the key cutting machine further includes a bracket passing below the key positioning fixture and having a first end coupled to the cutter head and a second end positioned to contact the tip of the lateral displacement element output shaft.

27. The key cutting machine of claim 26 wherein the bracket extends under and beyond the first side of the key positioning fixture to allow the tip of the lateral displacement element output shaft to contact the second end of the bracket without extending below the key positioning fixture.

28. The key cutting machine of claim 1 wherein the longitudinal displacement element includes:

a. a longitudinally fixed threaded nut rotationally coupled to a variable longitudinal position threaded shaft; and b. means for rotating the nut relative to the shaft in first or second directions to longitudinally displace the shaft in first or second directions.

29. The key cutting machine of claim 28 wherein the lateral displacement element includes:

a. a laterally fixed threaded nut rotationally coupled to a variable lateral position threaded shaft; and b. means for rotating the nut relative to the shaft in first or second directions to laterally displace the shaft in first or second directions.

30. The key cutting machine of claim 29 wherein the rotating means for the longitudinal and lateral displacement elements includes an electric motor.

31. A key cutting machine having a longitudinal axis and a lateral axis for cutting a defined bit notch pattern into a key blank having a longitudinal axis and a lateral axis, a length, a blade for receiving the defined bit notch pattern, and a tip, wherein the configuration of the defined bit notch pattern is specified either by a digital data signal or by a bit notch pattern in a blade of a master key having a longitudinal and a lateral axis, the key cutting machine comprising:

a. a laterally displaceable cutter head including a key follower and a spaced apart cutter wheel;

b. a motor for rotating the cutter wheel;

c. a key positioning fixture including i. a first key positioning fixture for aligning the longitudinal and lateral axes of the master key with the longitudinal and lateral axes of the key cutting machine, for aligning the master key bit notch pattern and the key blank blade relative to each other and for defining first longitudinal and lateral index positions relative to the master key blade;

ii. a second key positioning fixture for aligning the longitudinal and lateral axes of the key blank with the longitudinal and lateral axes of the key cutting machine and for defining second longitudinal and lateral index positions relative to the key blank blade;

d. a longitudinal displacement element for longitudinally displacing the cutter head and the key positioning fixture relative to each other;

e. a first electronic position sensor for measuring the longitudinal position of the cutter wheel relative to the second longitudinal index position and for generating a cutter wheel longitudinal position signal which defines the longitudinal position of the cutter wheel relative to the key blank blade;

f. a lateral displacement element for laterally displacing the cutter head and the key positioning fixture relative to each other;

g. a second electronic position sensor for measuring the lateral position of the cutter wheel relative to the second lateral index position and for generating a cutter wheel lateral position signal which defines the lateral position of the cutter wheel relative to the key blank blade; and h. a mode control system for selectively operating the key cutting machine in either i. an analog mode in which the lateral displacement element is disabled and in which the key follower engages the master key bit notch pattern and laterally displaces the cutter wheel and the key blank blade relative to each other as the cutter head and the key positioning fixture are longitudinally displaced relative to each other to mechanically trace and duplicate the master key bit notch pattern in the key blank blade; or ii. a digital mode in which the lateral displacement element laterally displaces the cutter wheel and the key blank blade relative to each other in response to the digital data signal and the longitudinal and lateral cutter wheel position signals as the cutter head and the key positioning fixture are longitudinally displaced relative to each other to electronically duplicate the defined bit notch pattern in the key blank blade without reference to the master bit notch pattern.

32. The key cutting machine of claim 31 wherein the first longitudinal index position coincides with the second longitudinal index position.

33. The key cutting machine of claim 32 wherein the first lateral index position coincides with the second lateral index position.

34. The key cutting machine of claim 31 wherein the key follower is positioned at a first elevation and the cutter wheel is positioned at a second elevation.

35. The key cutting machine of claim 34 wherein the longitudinal displacement element longitudinally displaces the key positioning fixture and the longitudinal position of the cutter head is fixed.

36. The key cutting machine of claim 35 wherein the cutter head is laterally displaceable relative to the key positioning fixture and includes a mechanism for biasing the cutter head toward the key positioning fixture.

37. The key cutting machine of claim 36 wherein the cutter head is positioned on a first side of the key positioning fixture and wherein the lateral displacement element is positioned on a second side of the key positioning fixture.

38. The key cutting machine of claim 37 wherein the lateral displacement element includes a variable position output shaft having a tip which contacts and pushes against but is not secured to the cutter head.

39. The key cutting machine of claim 38 wherein the lateral displacement element is disabled when the mode control system operates the key cutting machine in the analog mode by positioning the tip of the output shaft into a retracted position where the tip cannot contact or push against the cutter head.

40. The key cutting machine of claim 39 wherein the tip of the lateral displacement element output shaft remains in contact with the cutter head and disables the key follower when the mode control system operates the key cutting machine in the digital mode.

41. The key cutting machine of claim 38 wherein the lateral displacement element includes a stepper motor.

42. The key cutting machine of claim 38 wherein the lateral displacement element includes a linear actuator.

43. The key cutting machine of claim 34 wherein the key positioning fixture includes a removable cassette and wherein the first key positioning fixture is positioned within the cassette at a first elevation and wherein the second key positioning fixture is positioned within the cassette at a second elevation.

44. The key cutting machine of claim 43 wherein the first key positioning fixture is configured to establish the first longitudinal index position by referencing the tip of the master key and wherein the second key positioning fixture is configured to establish the second longitudinal index position by referencing the tip of the key blank.

45. The key cutting machine of claim 43 wherein the first key positioning fixture is configured to establish the first longitudinal index position by referencing the shoulder of the master key and wherein the second key positioning fixture is configured to establish the second longitudinal index position by referencing the shoulder of the key blank.

46. The key cutting machine of claim 38 wherein the key positioning fixture includes a first side and a second side and wherein the key cutting machine further includes a bracket passing below the key positioning fixture and having a first end coupled to the cutter head and a second end positioned to contact the tip of the lateral displacement element output shaft.

47. The key cutting machine of claim 46 wherein the bracket extends under and beyond the first side of the key positioning fixture to allow the tip of the lateral displacement element output shaft to contact the second end of the bracket without extending below the key positioning fixture.

48. The key cutting machine of claim 31 wherein the longitudinal displacement element includes:

a. a longitudinally fixed threaded nut rotationally coupled to a variable longitudinal position threaded shaft; and b. means for rotating the nut relative to the shaft in first or second directions to longitudinally displace the shaft in first or second directions.

49. The key cutting machine of claim 48 wherein the lateral displacement element includes:

a. a laterally fixed threaded nut rotationally coupled to a variable lateral position threaded shaft; and b. means for rotating the nut relative to the shaft in first or second directions to laterally displace the shaft in first or second directions.

50. The key cutting machine of claim 49 wherein the rotating means for the longitudinal and lateral displacement elements includes an electric motor.

51. A key cutting machine having a longitudinal axis and a lateral axis for cutting a defined bit notch pattern into a key blank having a length, a blade for receiving the defined bit notch pattern, and a tip, wherein the configuration of the defined bit notch pattern is specified either by a digital data signal or by a bit notch pattern in a blade of a master key, the key cutting machine comprising:

a. a laterally displaceable cutter head including a key follower and a spaced apart cutter wheel;

b. a motor for rotating the cutter wheel;

c. a key positioning fixture including
      i. a first key positioning fixture for positioning the master key to establish engagement between the key follower and the master key bit notch pattern at a first longitudinal index position to longitudinally align the master key bit notch pattern and the key blank blade relative to each other;
      ii. a second key positioning fixture for positioning the key blank to establish engagement between the cutter wheel and the key blank blade at a second longitudinal index position;

d. a longitudinal displacement element coupled to the key positioning fixture for longitudinally displacing the key positioning fixture and the cutter head relative to each other;

e. a position sensor for generating a cutter wheel position signal which defines the longitudinal and lateral position of the cutter wheel relative to the key blank blade;

f. a lateral displacement element engaging the cutter head for operating in either
      i. an analog mode in which the key follower is laterally displaced by the master key bit notch pattern and the displacements of the key follower laterally displace the cutter wheel and the key blank blade relative to each other as the cutter head and the key positioning fixture are longitudinally displaced relative to each other to duplicate the master key bit notch pattern in the key blank blade; or
      ii. a digital mode in which the cutter wheel and the key blank blade are laterally displaced relative to each other by the lateral displacement element in response to the digital data signal and the cutter wheel position signal as the cutter head and the key positioning fixture are longitudinally displaced relative to each other by the longitudinal displacement element to duplicate the defined bit notch pattern in the key blank blade without reference to the master key; and g. a mode control system for selectively operating the key cutting machine in the analog mode to trace the master key bit notch pattern and to duplicate the master key bit notch pattern in the key blank blade or in the digital mode to reproduce in the key blank blade the bit notch pattern defined by the digital data signal without tracing a master key bit notch pattern.

52. The key cutting machine of claim 51 wherein the first longitudinal index position coincides with the second longitudinal index position.

53. The key cutting machine of claim 52 wherein the first lateral index position coincides with the second lateral index position.

54. The key cutting machine of claim 51 wherein the key follower is positioned at a first elevation and the cutter wheel is positioned at a second elevation.

55. The key cutting machine of claim 54 wherein the longitudinal displacement element longitudinally displaces the key positioning fixture and the longitudinal position of the cutter head is fixed.

56. The key cutting machine of claim 55 wherein the cutter head is laterally displaceable relative to the key positioning fixture and includes a mechanism for biasing the cutter head toward the key positioning fixture.

57. The key cutting machine of claim 56 wherein the cutter head is positioned on a first side of the key positioning fixture and wherein the lateral displacement element is positioned on a second side of the key positioning fixture.

58. The key cutting machine of claim 57 wherein the lateral displacement element includes a variable position output shaft having a tip which contacts and pushes against but is not secured to the cutter head.

59. The key cutting machine of claim 58 wherein the lateral displacement element is disabled when the mode control system operates the key cutting machine in the analog mode by positioning the tip of the output shaft into a retracted position where the tip cannot contact or push against the cutter head.

60. The key cutting machine of claim 59 wherein the tip of the lateral displacement element output shaft remains in contact with the cutter head and disables the key follower when the mode control system operates the key cutting machine in the digital mode.

61. The key cutting machine of claim 58 wherein the lateral displacement element includes a stepper motor.

62. The key cutting machine of claim 58 wherein the lateral displacement element includes a linear actuator.

63. The key cutting machine of claim 54 wherein the key positioning fixture includes a removable cassette and wherein the first key positioning fixture is positioned within the cassette at a first elevation and wherein the second key positioning fixture is positioned within the cassette at a second elevation.

64. The key cutting machine of claim 63 wherein the first key positioning fixture is configured to establish the first longitudinal index position by referencing the tip of the master key and wherein the second key positioning fixture is configured to establish the second longitudinal index position by referencing the tip of the key blank.

65. The key cutting machine of claim 63 wherein the first key positioning fixture is configured to establish the first longitudinal index position by referencing the shoulder of the master key and wherein the second key positioning fixture is configured to establish the second longitudinal index position by referencing the shoulder of the key blank.

66. The key cutting machine of claim 58 wherein the key positioning fixture includes a first side and a second side and wherein the key cutting machine further includes a bracket passing below the key positioning fixture and having a first end coupled to the cutter head and a second end positioned to contact the tip of the lateral displacement element output shaft.

67. The key cutting machine of claim 66 wherein the bracket extends under and beyond the first side of the key positioning fixture to allow the tip of the lateral displacement element output shaft to contact the second end of the bracket without extending below the key positioning fixture.

68. The key cutting machine of claim 51 wherein the longitudinal displacement element includes:

a. a longitudinally fixed threaded nut rotationally coupled to a variable longitudinal position threaded shaft; and b. means for rotating the nut relative to the shaft in first or second directions to longitudinally displace the shaft in first or second directions.

69. The key cutting machine of claim 68 wherein the lateral displacement element includes:
   a. a laterally fixed threaded nut rotationally coupled to a variable lateral position threaded shaft; and
   b. means for rotating the nut relative to the shaft in first or second directions to laterally displace the shaft in first or second directions.

70. The key cutting machine of claim 69 wherein the rotating means for the longitudinal and lateral displacement elements includes an electric motor.

71. A method for cutting a defined bit notch pattern into a key blank having a longitudinal axis and a lateral axis, a length, a blade for receiving the defined bit notch pattern, and a tip, wherein the configuration of the defined bit notch pattern is specified either by a digital data signal or by a bit notch pattern in a blade of a master key having a longitudinal and a lateral axis, comprising the steps of:
   a. providing a cutter wheel and a spaced apart key follower;
   b. aligning the key blank blade relative to the master key bit notch pattern or to an index position;
   c. longitudinally displacing the cutter wheel and the key blank blade relative to each other;
   d. measuring the longitudinal position of the cutter wheel relative to the key blank blade and generating a cutter wheel longitudinal position signal to define the longitudinal position of the cutter wheel relative to the key blank blade;
   e. laterally displacing the cutter wheel and the key blank blade relative to each other;
   f. measuring the lateral position of the cutter wheel relative to the key blank blade and generating a cutter wheel lateral position signal to define the lateral position of the cutter wheel relative to the key blank blade; and
   g. selecting an operating mode for cutting the defined bit notch pattern into the key blank by operating either
      i. in an analog mode in which the key follower engages the master key bit notch pattern and laterally displaces the cutter wheel and the key blank blade relative to each other as the key follower and the master key blade are longitudinally displaced relative to each other to mechanically trace and duplicate the master key bit notch pattern in the key blank blade; or
      ii. in a digital mode in which the cutter wheel and the key blank blade are laterally displaced relative to each other in response to the digital data signal and the longitudinal and lateral cutter wheel position signals as the cutter wheel and the key blank blade are longitudinally displaced relative to each other to electronically duplicate the defined bit notch pattern in the key blank blade without reference to the master key bit notch pattern.

72. The method of claim 71 including the further step of forming the cutter wheel and the key follower as elements of a single cutter head.

73. The method of claim 72 including the further steps of positioning the key follower at a first elevation and positioning the cutter wheel at a second elevation.

74. The method of claim 71 including the further steps of providing a fixed lateral position threaded nut engaging a variable lateral position threaded shaft and rotating the nut in first or second directions to laterally displace the cutter wheel and the key blade relative to each other.

75. The method of claim 74 including the further steps of providing a fixed longitudinal position threaded nut engaging a variable longitudinal position threaded shaft and rotating the nut in first or second directions to longitudinally displace the cutter wheel and the key blade relative to each other.

76. A key cutting machine having a longitudinal axis and a lateral axis for cutting first and second defined bit notch patterns into a key blank having a length, a blade for receiving the first and second defined bit notch patterns, and a tip, wherein the configuration of the first and second defined bit notch patterns is specified either by a digital data signal or by first and second bit notch patterns in a blade of a master key, the key cutting machine comprising:
   a. a first laterally displaceable cutter head located on a first side of the longitudinal axis and including a first key follower and a spaced apart, rotatable first cutter wheel;
   b. a second laterally displaceable cutter head located on a second side of the longitudinal axis and including a second key follower and a spaced apart, rotatable second cutter wheel;
   c. a key positioning fixture including
      i. a first key positioning fixture for positioning the master key to establish engagement between the first and second key followers and the first and second master key bit notch patterns at a first longitudinal index position to longitudinally align the master key bit notch patterns and the key blank blade relative to each other;
      ii. a second key positioning fixture for positioning the key blank to establish engagement between the first and second cutter wheels and the key blank blade at a second longitudinal index position;
   d. a longitudinal displacement element coupled to the key positioning fixture for longitudinally displacing the key positioning fixture and the first and second cutter heads relative to each other;
   e. a position sensor for generating a cutter wheel position signal which defines the longitudinal and lateral position of the first and second cutter wheels relative to the key blank blade;
   f. first and second lateral displacement elements engaging the first and second cutter heads for operating in either
      i. an analog mode in which the first and second key followers are laterally displaced by the master key bit notch patterns and the displacements of the first and second key followers laterally displace the first and second cutter wheels and the key blank blade relative to each other as the cutter heads and the key positioning fixture are longitudinally displaced relative to each other to duplicate the master key bit notch patterns in the key blank blade; or
      ii. a digital mode in which the first and second cutter wheels and the key blank blade are laterally displaced relative to each other by the first and second lateral displacement elements in response to the digital data signal and the cutter wheel position signal as the first and second cutter heads and the key positioning fixture are longitudinally displaced relative to each other by the longitudinal displacement element to duplicate the first and second defined bit notch patterns in the key blank blade without reference to the master key; and
   g. a mode control system for selectively operating the key cutting machine in the analog mode to trace the master key bit notch patterns and to duplicate the master key bit notch patterns in the key blank blade or in the digital mode to reproduce in the key blank blade the bit notch patterns defined by the digital data signal without tracing bit notch patterns from a master key.

77. The key cutting machine of claim 76 wherein the first longitudinal index position coincides with the second longitudinal index position.

78. The key cutting machine of claim 77 wherein the first lateral index position coincides with the second lateral index position.

79. The key cutting machine of claim 76 wherein the first and second key followers are positioned at a first elevation and the first and second cutter wheels are positioned at a second elevation.

80. The key cutting machine of claim 79 wherein the longitudinal displacement element longitudinally displaces the key positioning fixture and the longitudinal position of the first and second cutter heads is fixed.

81. The key cutting machine of claim 80 wherein the first and second cutter heads are laterally displaceable relative to the key positioning fixture and include a mechanism for biasing the cutter heads toward the key positioning fixture.

82. The key cutting machine of claim 81 wherein the first cutter head is positioned on a first side of the key positioning fixture and wherein the first lateral displacement element is positioned on a second side of the key positioning fixture.

83. The key cutting machine of claim 82 wherein the first and second lateral displacement elements each includes a variable position output shaft having a tip which contacts and pushes against but is not secured to the cutter head engaged by each lateral displacement element.

84. The key cutting machine of claim 83 wherein the first and second lateral displacement elements are disabled when the mode control system operates the key cutting machine in the analog mode by positioning the tip of each output shaft into a retracted position where the tip cannot contact or push against the cutter head.

85. The key cutting machine of claim 84 wherein the tip of each lateral displacement element output shaft remains in contact with the related cutter head and disables the key follower when the mode control system operates the key cutting machine in the digital mode.

86. The key cutting machine of claim 83 wherein each of the first and second lateral displacement elements is driven by a stepper motor.

87. The key cutting machine of claim 83 wherein each of the first and second lateral displacement elements is driven by a linear actuator.

88. The key cutting machine of claim 79 wherein the key positioning fixture includes a removable cassette and wherein the first key positioning fixture is positioned within the cassette at a first elevation and wherein the second key positioning fixture is positioned within the cassette at a second elevation.

89. The key cutting machine of claim 88 wherein the first key positioning fixture is configured to establish the first longitudinal index position by referencing the tip of the master key and wherein the second key positioning fixture is configured to establish the second longitudinal index position by referencing the tip of the key blank.

90. The key cutting machine of claim 88 wherein the first key positioning fixture is configured to establish the first longitudinal index position by referencing the shoulder of the master key and wherein the second key positioning fixture is configured to establish the second longitudinal index position by referencing the shoulder of the key blank.

91. The key cutting machine of claim 83 wherein the key cutting machine further includes a first bracket for transmitting the movement of the first lateral displacement element output shaft to the first cutter head and a second bracket for transmitting the movement of the second lateral displacement element output shaft to the second cutter head.

92. The key cutting machine of claim 83 wherein the key cutting machine further includes a first bracket for transmitting the movement of the first lateral displacement element output shaft to the second cutter head and a second bracket for transmitting the movement of the second lateral displacement element output shaft to the first cutter head.

93. The key cutting machine of claim 76 wherein each of the first and second longitudinal displacement elements includes:

a. a longitudinally fixed threaded nut rotationally coupled to a variable longitudinal position threaded shaft; and b. means for rotating the nut relative to the shaft in first or second directions to longitudinally displace the shaft in first or second directions.

94. The key cutting machine of claim 93 wherein each of the first and second lateral displacement element includes:

a. a laterally fixed threaded nut rotationally coupled to a variable lateral position threaded shaft; and b. means for rotating the nut relative to the shaft in first or second directions to laterally displace the shaft in first or second directions.

95. The key cutting machine of claim 94 wherein the rotating means for the longitudinal displacement element and for the first and second lateral displacement elements includes an electric motor.

96. A key cutting machine having a longitudinal axis and a lateral axis for cutting a defined bit notch pattern into a key blank having a longitudinal axis and a lateral axis, a length, a blade for receiving the defined bit notch pattern, and a tip, wherein the configuration of the defined bit notch pattern is specified either by a digital data signal or by a bit notch pattern in a blade of a master key having a longitudinal and a lateral axis, the key cutting machine comprising:

a. a cutter wheel;

b. a key follower spaced apart from the cutter wheel; and c. a mode control system for selectively configuring the key cutting machine to operate in either i. an analog mode in which the key follower engages the master key bit notch pattern and laterally displaces the cutter wheel and the key blank blade relative to each other as the key follower and the master key blade are longitudinally displaced relative to each other to mechanically trace and duplicate the master key bit notch pattern in the key blank blade; or ii. a digital mode in which the cutter wheel and the key blank blade are laterally displaced relative to each other in response to the digital data signal as the cutter wheel and the key blank blade are longitudinally displaced relative to each other to electronically duplicate the defined bit notch pattern in the key blank blade without reference to the master key bit notch pattern.

97. A key cutting machine having a longitudinal axis and a lateral axis for cutting a defined bit notch pattern into a key blank having a longitudinal axis and a lateral axis, a length, a blade for receiving the defined bit notch pattern, and a tip, wherein the configuration of the defined bit notch pattern is specified either by a digital data signal or by a bit notch pattern in a blade of a master key having a longitudinal and a lateral axis, the key cutting machine comprising:

a. a cutter wheel;

b. a key follower spaced apart from the cutter wheel;

c. a longitudinal displacement element for longitudinally displacing the cutter wheel and the key blank blade relative to each other;

d. a lateral displacement element for laterally displacing the cutter wheel and the key blank blade relative to each other; and e. a mode control system for selectively configuring the key cutting machine to operate in either i. an analog mode in which the lateral displacement element is disabled and in which the key follower engages the master key bit notch pattern and laterally displaces the cutter wheel and the key blank blade relative to each other as the key follower and the master key blade are longitudinally displaced relative to each other to mechanically trace and duplicate the master key bit notch pattern in the key blank blade; or ii. a digital mode in which the lateral displacement element laterally displaces the cutter wheel and the key blank blade relative to each other in response to the digital data signal as the cutter wheel and the key blank blade are longitudinally displaced relative to each other to electronically duplicate the defined bit notch pattern in the key blank blade without reference to the master key bit notch pattern.

98. The key cutting machine of claim 97 further including a position sensor for generating a cutter wheel position signal which defines the longitudinal and lateral position of the cutter wheel relative to the key blade blank and wherein the lateral displacement element laterally displaces the cutter wheel and the key blank blade relative to each other in response to the cutter wheel position signal.

99. The key cutting machine of 98 wherein the position sensor further includes:

a. a first electronic position sensor for measuring the longitudinal position of the cutter wheel and for generating a cutter wheel longitudinal position signal which defines the longitudinal position of the cutter wheel relative to the key blank blade; and b. a second electronic position sensor for measuring the lateral position of the cutter wheel and for generating a cutter wheel lateral position signal which defines the lateral position of the cutter wheel relative to the key blank blade.

100. The key cutting machine of claims 97 or 98 wherein the cutter wheel and the key follower are coupled to a cutter head.

101. The key cutting machine of claim 100 wherein the lateral displacement element includes a variable position output shaft having a tip which contacts and pushes against but is not secured to the cutter head.

102. The key cutting machine of claim 101 wherein the lateral displacement element is disabled when the mode control system operates the key cutting machine in the analog mode by positioning the tip of the output shaft into a retracted position where the tip cannot contact or push against the cutter head.

103. The key cutting machine of claim 102 wherein the tip of the lateral displacement element output shaft remains in contact with the cutter head and disables the key follower when the mode control system operates the key cutting machine in the digital mode.

104. The key cutting machine of claims 97 or 98 further including a key positioning fixture comprising:

a. a first key positioning fixture for aligning the longitudinal and lateral axes of the master key with the longitudinal and lateral axes of the key cutting machine and for defining first longitudinal and lateral index positions relative to the master key blade and for aligning the master key bit notch pattern and the key blank blade relative to each other;

b. a second key positioning fixture for aligning the longitudinal and lateral axes of the key blank with the longitudinal and lateral axes of the key cutting machine and for defining second longitudinal and lateral index positions relative to the key blank blade.

105. The key cutting machine of claim 104 wherein the key positioning fixture includes a removable cassette and wherein the first key positioning fixture is positioned within the cassette at a first elevation and wherein the second key positioning fixture is positioned within the cassette at a second elevation.

106. The key cutting machine of claim 105 wherein the first key positioning fixture is configured to establish the first longitudinal index position by referencing the tip of the master key and wherein the second key positioning fixture is configured to establish the second longitudinal index position by referencing the tip of the key blank.

107. The key cutting machine of claim 105 wherein the master key and key blank each include a shoulder wherein the first key positioning fixture is configured to establish the first longitudinal index position by referencing the shoulder of the master key and wherein the second key positioning fixture is configured to establish the second longitudinal index position by referencing the shoulder of the key blank.

108. The key cutting machine of claims 97 or 98 wherein the longitudinal displacement element includes:

a. a longitudinally fixed threaded nut rotationally coupled to a variable longitudinal position threaded shaft; and b. means for rotating the nut and the shaft relative to each other in first or second directions to longitudinally displace the shaft in first or second directions.

109. The key cutting machine of claim 108 wherein the lateral displacement element includes:

a. a laterally fixed threaded nut rotationally coupled to a variable lateral position threaded shaft; and b. means for rotating the nut and the shaft relative to each other in first or second directions to laterally displace the shaft in first or second directions.

110. A method for cutting a defined bit notch pattern into a key blank having a longitudinal axis and a lateral axis, a length, a blade for receiving the defined bit notch pattern, and a tip, wherein the configuration of the defined bit notch pattern is specified either by a digital data signal or by a bit notch pattern in a blade of a master key having a longitudinal and a lateral axis, comprising the steps of:

a. providing a cutter wheel and a spaced apart key follower; and b. selecting an operating mode for cutting the defined bit notch pattern into the key blank by operating either i. in an analog mode in which the key follower engages the master key bit notch pattern and laterally displaces the cutter wheel and the key blank blade relative to each other as the key follower and the master key blade are longitudinally displaced relative to each other to mechanically trace and duplicate the master key bit notch pattern in the key blank blade; or ii. in a digital mode in which the cutter wheel and the key blank blade are laterally displaced relative to each other in response to the digital data signal and the longitudinal and lateral cutter wheel position signals as the cutter wheel and the key blank blade are longitudinally displaced relative to each other to electronically duplicate the defined bit notch pattern in the key blank blade without reference to the master key bit notch pattern.

111. The method of claim 110 including the further steps of positioning the key follower at a first elevation and positioning the cutter wheel at a second elevation.

112. The method of claims 110 or 111 including the further steps of providing a fixed lateral position threaded nut engaging a variable lateral position threaded shaft and rotating the nut and the shaft relative to each other in first or second directions to laterally displace the cutter wheel and the key blade relative to each other.

113. The method of claim 112 including the further steps of providing a fixed longitudinal position threaded nut engaging a variable longitudinal position threaded shaft and rotating the nut and the shaft relative to each other in first or second directions to longitudinally displace the cutter wheel and the key blade relative to each other.

* * * * *